(12) United States Patent
Busey

(10) Patent No.: US 7,716,371 B2
(45) Date of Patent: May 11, 2010

(54) METHOD, SYSTEM, AND COMPUTER PROGRAM PRODUCT FOR SYNCHRONIZING INFORMATION WITHIN A GLOBAL COMPUTER NETWORK

(75) Inventor: Andrew Thomas Busey, Austin, TX (US)

(73) Assignee: Demand Media, Inc., Santa Monica, CA (US)

( * ) Notice: Subject to any disclaimer, the term of this patent is extended or adjusted under 35 U.S.C. 154(b) by 78 days.

(21) Appl. No.: 10/578,415

(22) PCT Filed: Apr. 18, 2005

(86) PCT No.: PCT/US2005/013068

§ 371 (c)(1),
(2), (4) Date: May 5, 2006

(87) PCT Pub. No.: WO2005/103929

PCT Pub. Date: Nov. 3, 2005

(65) Prior Publication Data

US 2007/0174487 A1 Jul. 26, 2007

Related U.S. Application Data

(60) Provisional application No. 60/563,705, filed on Apr. 20, 2004, provisional application No. 60/563,706, filed on Apr. 20, 2004, provisional application No. 60/563,719, filed on Apr. 20, 2004, provisional application No. 60/563,713, filed on Apr. 20, 2004, provisional application No. 60/563,615, filed on Apr. 20, 2004.

(51) Int. Cl.
*G06F 15/16* (2006.01)
*G06F 17/00* (2006.01)
(52) U.S. Cl. .................. 709/246; 709/248; 715/239

(58) Field of Classification Search .............. 709/246, 709/248
See application file for complete search history.

(56) References Cited

U.S. PATENT DOCUMENTS

| | | | |
|---|---|---|---|
| 6,708,172 B1 * | 3/2004 | Wong et al. | .................. 707/10 |
| 6,865,599 B2 * | 3/2005 | Zhang | ........................ 709/218 |
| 6,915,304 B2 | 7/2005 | Krupa | |
| 7,111,076 B2 | 9/2006 | Abjanic et al. | |
| 7,134,075 B2 | 11/2006 | Hind et al. | |
| 7,219,308 B2 | 5/2007 | Novak et al. | |
| 7,310,612 B2 * | 12/2007 | McQueen et al. | ............. 705/26 |
| 2002/0133561 A1 * | 9/2002 | O'Brien et al. | ............. 709/213 |
| 2003/0093790 A1 * | 5/2003 | Logan et al. | .................. 725/38 |

(Continued)

OTHER PUBLICATIONS

Tepper, Michele; The Rise of Social Software; Sep. 2003; netWorker Magazine; vol. 7, Issue 3; pp. 18-23.*

(Continued)

*Primary Examiner*—Moustafa M Meky
*Assistant Examiner*—Blake Rubin
(74) *Attorney, Agent, or Firm*—Greenberg Traurig, LLP

(57) ABSTRACT

In one embodiment, at least one first information handling system of a user receives an excerpt of information associated with the user. In response to the excerpt, the first information handling system automatically translates the excerpt into an XML format, so that the translated excerpt is compatible for operation with at least one second information handling system of the user. The first information handling system synchronizes the translated excerpt with the second information handling system.

21 Claims, 22 Drawing Sheets

U.S. PATENT DOCUMENTS

2003/0145056 A1* 7/2003 Fujisawa et al. ............ 709/205
2004/0139845 A1   7/2004 Tohgi et al.
2004/0199514 A1* 10/2004 Rosenblatt et al. ............ 707/10

OTHER PUBLICATIONS

Cayzer, Steve; Semantic blogging and decentralized knowledge management; Dec. 2004; Communications of the ACM; vol. 47, Issue 12; pp. 47-52.*

Hideaki Takeda, Takeshi Matsuzuka and Yuichiro Taniguchi: "Discovery of Shared Topics Networks among People—A Simple Approach to Find Community Knowledge from WWW Bookmarks—", Proc. of PRICAI 2000, pp. 668-678, 2000. http://citeseer.ist.psu.edu/takeda00discovery.html.*

Olsen, S., "Yahoo hints at social networking service", CNET News. com, Apr. 7, 2004, pp. 1-3, CNET Networks, Inc.

* cited by examiner

User Registration

E-mail address:
busey@pluck.com

E-mail addresses must be verified before the account can become active. In future versions you will be able to register multiple e-mail addresses.

Password:
******

Confirm Password: ←——— 300
******

Passwords must be at least six characters in length and must contain at least one number or symbol.

Do you use multiple computers?
⊙ Yes
⊙ No

Select yes if you use multiple computers and you want Pluck to help you keep your web experience synchronized between them.

[Back] [Next >] [Cancel]

*Fig. 3A*

Creating Folder

Folder Details
Public Folder

Folder Name:
RSS Research

Folder Category:
Technology

Folder Keywords: (separate keywords with commas)
Research, Pluck, RSS, Atom, Newsfeeds, Feeds Folder Description:
Articles, directories, standards information, and everything else you might want to know about RSS and Atom.

☑ Publish Folder

Publishing this folder means that anyone who searches the Pluck Directory for keywords or items in the title or description will find this folder and be able to subscribe to it.

— 400

< Back    Next >    Cancel

*Fig. 4G*

Share

To: Target list of shares (can enter e-mail here or below)
Groups: Enter Text ▽ [Add]
Title: Custom Name
Item: Pluck Home Page 🏠

Enter Text

600                                                    [Share]

Contact Helper ⊗

| Friends | Group Folders | Public Folders |

Select Groups

- ☑ Pluck Competition     ☑ Duke Basketball
- ☑ Pluck Research        ☑ Wharton Related
- ☑ Pluck Reviews         ☑ Strongbad
- ☑ Interesting Stocks    ☑ Funny Weird Stuff
- ☐ Tech News             ☐ RSS/Atom
- ☐ Living Crew           ☐ Games

◁                                          ▷

[Share With Selected]

New Group

[Create a New Group Folder]   [Add]

— Drop down list of groups the user has the right to publish to. 622

— Adds selected groups to shared list. 624

— Launches create new folder wizard. At end the group is added to the target list. 626

*Fig. 6C*

METHOD, SYSTEM, AND COMPUTER PROGRAM PRODUCT FOR SYNCHRONIZING INFORMATION WITHIN A GLOBAL COMPUTER NETWORK

CROSS-REFERENCE TO RELATED APPLICATIONS

This application claims priority to PCT Application Ser. No. PCT/US2005/013068, filed Apr. 18, 2005, by Andrew Thomas Busey, entitled METHOD, SYSTEM AND COMPUTER PROGRAM PRODUCT FOR SHARING INFORMATION WITHIN A GLOBAL COMPUTER NETWORK, which: (a) is assigned to the assignee of this application; (b) is incorporated herein by reference in its entirety; and (c) claims priority to the following U.S. Provisional Patent Applications, filed Apr. 20, 2004, by Andrew Thomas Busey, which are assigned to the assignee of this application, and which are incorporated herein by reference in their entirety: (i) U.S. Provisional Patent Application No. 60/563,615, entitled METHOD, SYSTEM AND COMPUTER PROGRAM PRODUCT FOR SAVING A SEARCH WITHIN A GLOBAL COMPUTER NETWORK; (ii) U.S. Provisional Patent Application No. 60/563,705, entitled METHOD, SYSTEM AND COMPUTER PROGRAM PRODUCT FOR SHARING INFORMATION WITHIN A GLOBAL COMPUTER NETWORK; (iii) U.S. Provisional Patent Application No. 60/563,706, entitled METHOD, SYSTEM AND COMPUTER PROGRAM PRODUCT FOR TRANSLATING INFORMATION FOR COMPATIBILITY WITH AN INFORMATION HANDLING SYSTEM; (iv) U.S. Provisional Patent Application No. 60/563,713, entitled METHOD, SYSTEM AND COMPUTER PROGRAM PRODUCT FOR AUTOMATICALLY PERFORMING AN OPERATION IN RESPONSE TO INFORMATION; and (v) U.S. Provisional Patent Application No. 60/563,719, entitled METHOD, SYSTEM AND COMPUTER PROGRAM PRODUCT FOR SYNCHRONIZING INFORMATION WITHIN A GLOBAL COMPUTER NETWORK.

Also, this application relates to the following co-pending U.S. patent applications, filed concurrently herewith, by Andrew Thomas Busey, which are assigned to the assignee of this application, and which are incorporated herein by reference in their entirety: (a) U.S. patent application Ser. No. 10/578,411, entitled METHOD, SYSTEM AND COMPUTER PROGRAM PRODUCT FOR SAVING A SEARCH WITHIN A GLOBAL COMPUTER NETWORK; (b) U.S. patent application Ser. No. 10,578,416, entitled METHOD, SYSTEM AND COMPUTER PROGRAM PRODUCT FOR SHARING INFORMATION WITHIN A GLOBAL COMPUTER NETWORK; (c) U.S. patent application Ser. No. 10/578,417, entitled METHOD, SYSTEM AND COMPUTER PROGRAM PRODUCT FOR TRANSLATING INFORMATION FOR COMPATIBILITY WITH AN INFORMATION HANDLING SYSTEM; and (d) U.S. patent application Ser. No. 10/578,606, entitled METHOD, SYSTEM AND COMPUTER PROGRAM PRODUCT FOR AUTOMATICALLY PERFORMING AN OPERATION IN RESPONSE TO INFORMATION.

BACKGROUND OF THE INVENTION

A global communication network, such as a Transport Control Protocol/Internet Protocol ("TCP/IP") network (e.g., the Internet or an intranet), has been developed to facilitate communications. Clients and servers include respective network interfaces for communicating with the network. Network communications include outputting information to and receiving information from the network.

BRIEF DESCRIPTION OF THE DRAWING

FIG. 3a is an illustration of a $1^{st}$ screen displayed by a display device of a representative client of FIG. 1.

FIG. 4g is an illustration of a $12^{th}$ screen displayed by a display device of a representative client of FIG. 1.

FIG. 6c is an illustration of a $19^{th}$ screen displayed by a display device of a representative client of FIG. 1.

DETAILED DESCRIPTION

Figure 1:
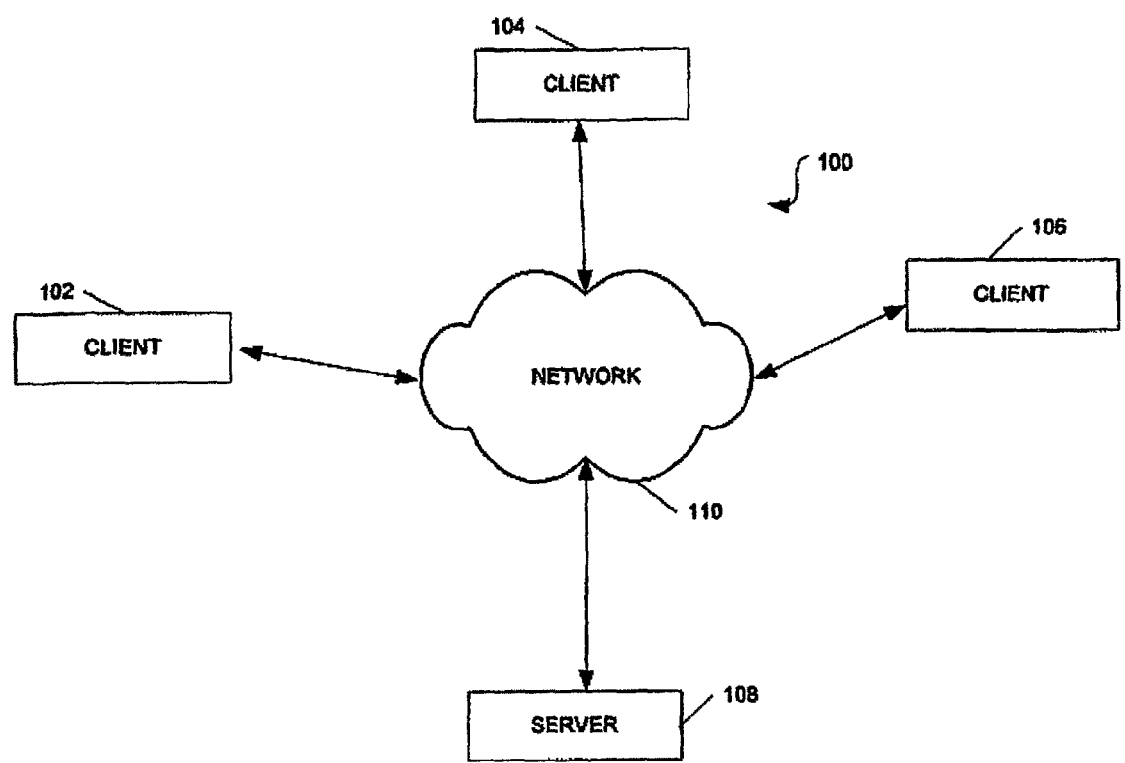
FIG. 1 is a block diagram of a system according to the illustrative embodiment.

FIG. 1 is a block diagram of a system, indicated generally at 100 according to the illustrative embodiment. The system 100 includes: (a) clients 102, 104, and 106 and (b) server 108, each for executing server processes as discussed further below in connection with FIGS. 3-7. The system 100 also includes a global computer network 110, such as a Transport Control Protocol/Internet Protocol ("TCP/IP") network (e.g., the Internet or an intranet). In the following discussion, if a feature of system 100 is discussed in relation to the Internet, then such feature is likewise applicable to an intranet.

Each of the clients 102, 104, and 106, the server 108, and the network 110 is a respective information handling system ("IHS") for executing processes and performing operations (e.g., processing and communicating information) in response thereto, as discussed further below in connection with FIGS. 2-5. Each such IHS is formed by various electronic circuitry components. Moreover, as shown in Fig 1, all such IHSs are coupled to one another accordingly, the clients 102, 104, and 106, and the servers 108 operate within the network 110.

For clarity, FIG. 1 depicts only three clients 102, 104, and 106 although the system 100 may include additional clients which are substantially identical to one another. Likewise, for clarity, FIG. 1 depicts only one server 108, although the system 100 may include additional servers which are substantially identical to one another. In the discussion below, the client 102 is a representative one of the clients 102, 104, and 106. However, in an alternative embodiment, any one or more of clients 102, 104 and 106 is a handheld device, such as a mobile telephone, which is a portable type of information handling system.

Each of the clients 102, 104, and 106, the server 108, and the network 110 is a respective information handling system ("IHS") for executing processes and performing operations (e.g., processing and communicating information) in response thereto, as discussed further below in connection with FIGS. 2-5. Each such IHS is formed by various electronic circuitry components. Moreover, as shown in FIG. 1, all such IHSs are coupled to one another. Accordingly, the clients 102, 104, and 106, and the servers 108 operate within the network 112.

In FIG. 1, any one or more of the clients 102, 104, and 106 and/or the server 108 is equipped so that a user (e.g., a user of the client 102) is able to selectively share a resource (e.g., information, or source or destination of information) within the network 110 with one or more users. A webpage is one example of such a resource, such as: (a) a webpage created (e.g., "published") or edited by the user and/or by another user; or (b) any other generally addressable webpage (e.g., any webpage accessed through the global Internet).

Figure 2:
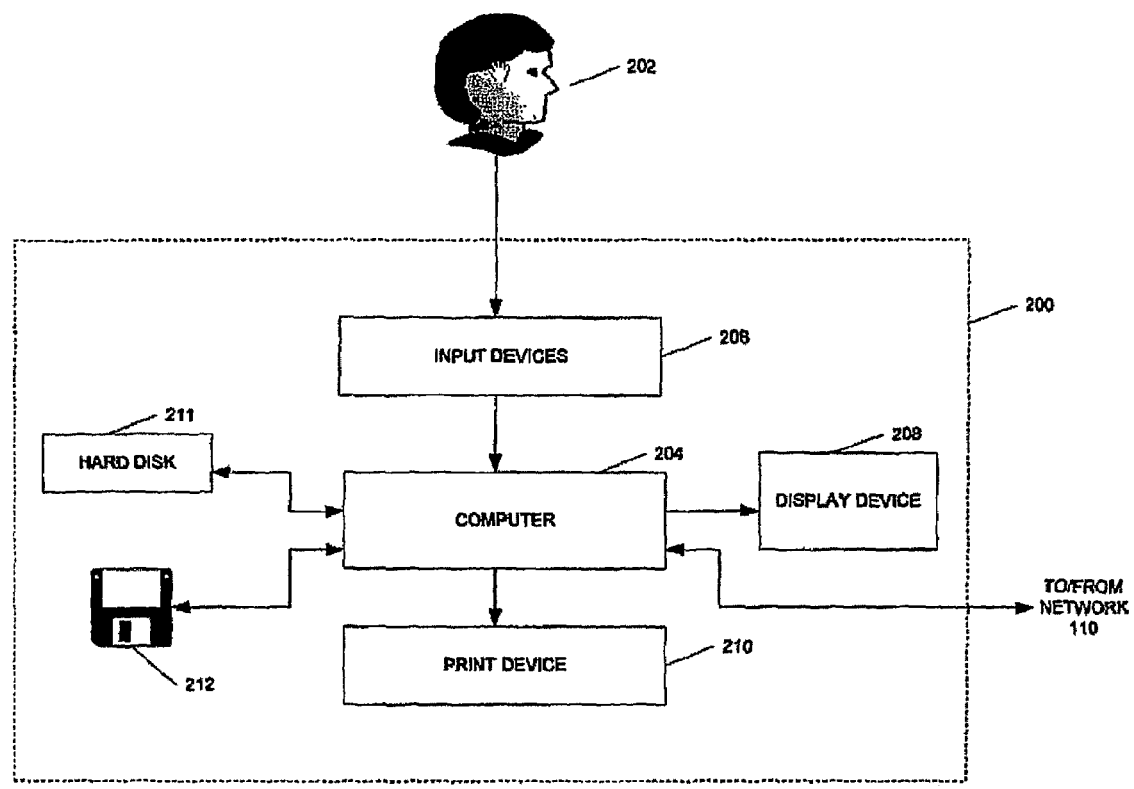
FIG. 2 is a block diagram of a representative information handling system of FIG. 1.
Figure 3B:
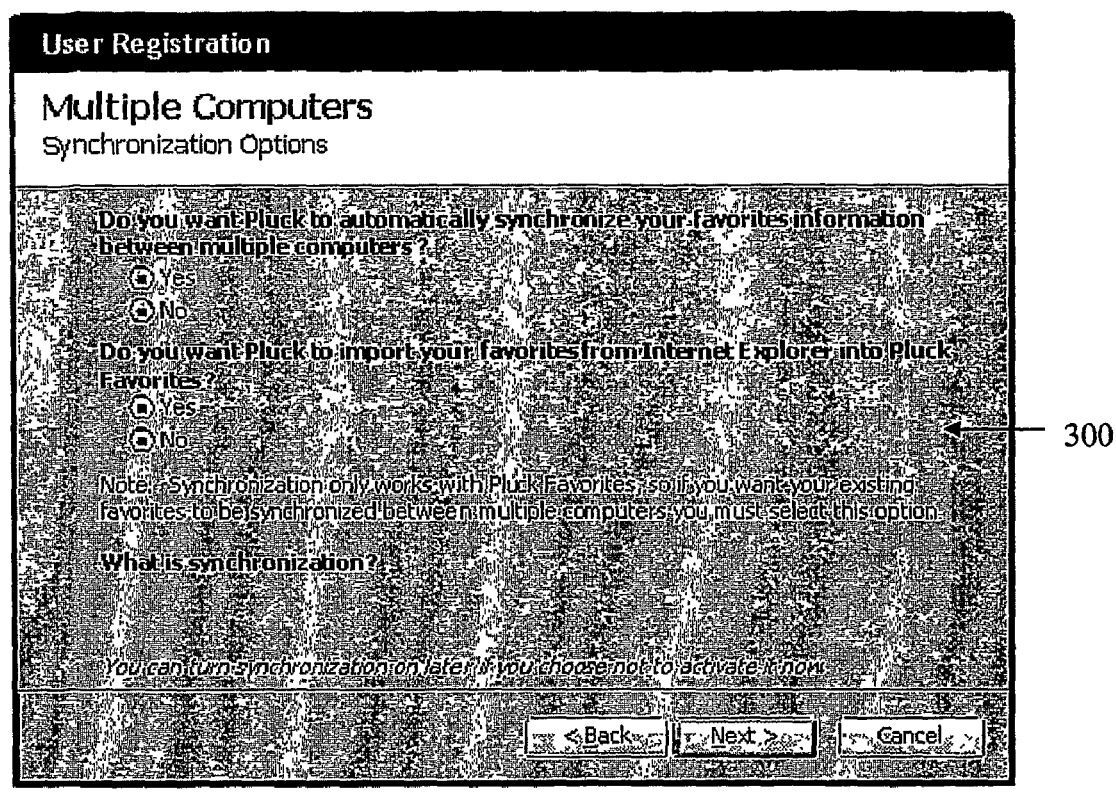
FIG. 3b is an illustration of a $2^{nd}$ screen displayed by a display device of a representative client of FIG. 1.
Figure 3C:
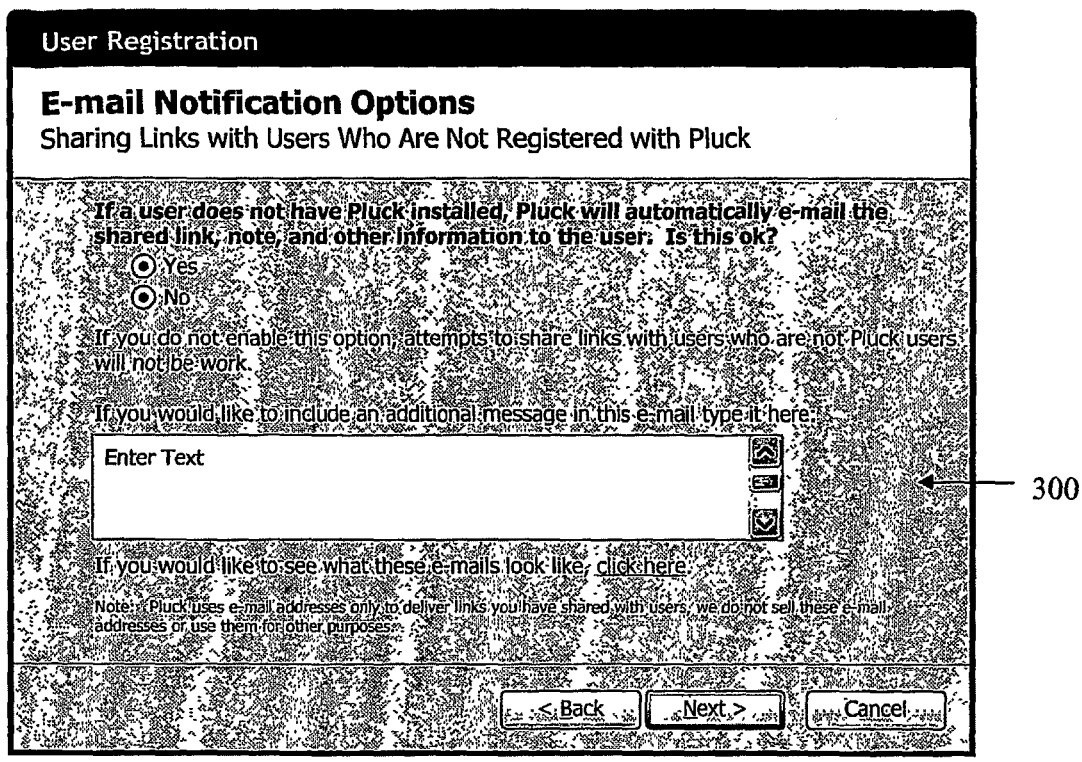
FIG. 3c is an illustration of a $3^{rd}$ screen displayed by a display device of a representative client of FIG. 1.
Figure 3D:
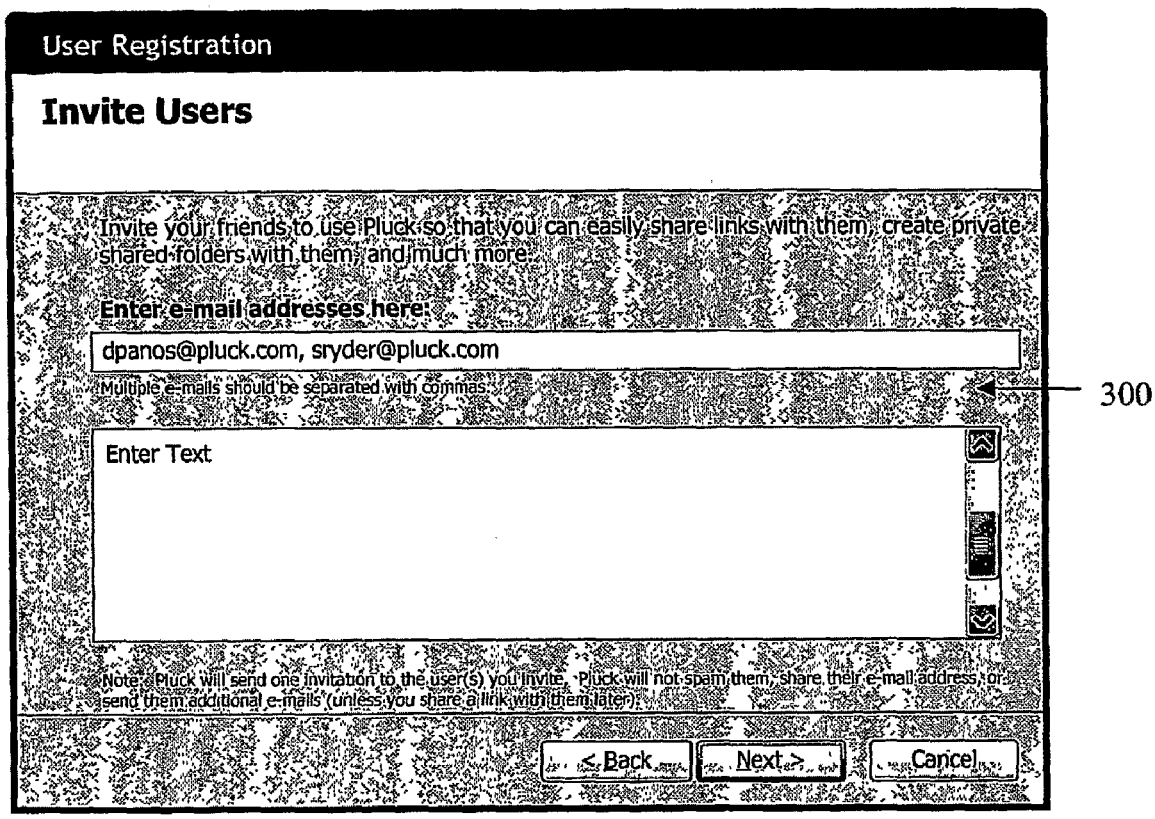
FIG. 3d is an illustration of a $4^{th}$ screen displayed by a display device of a representative client of FIG. 1.
Figure 3E:
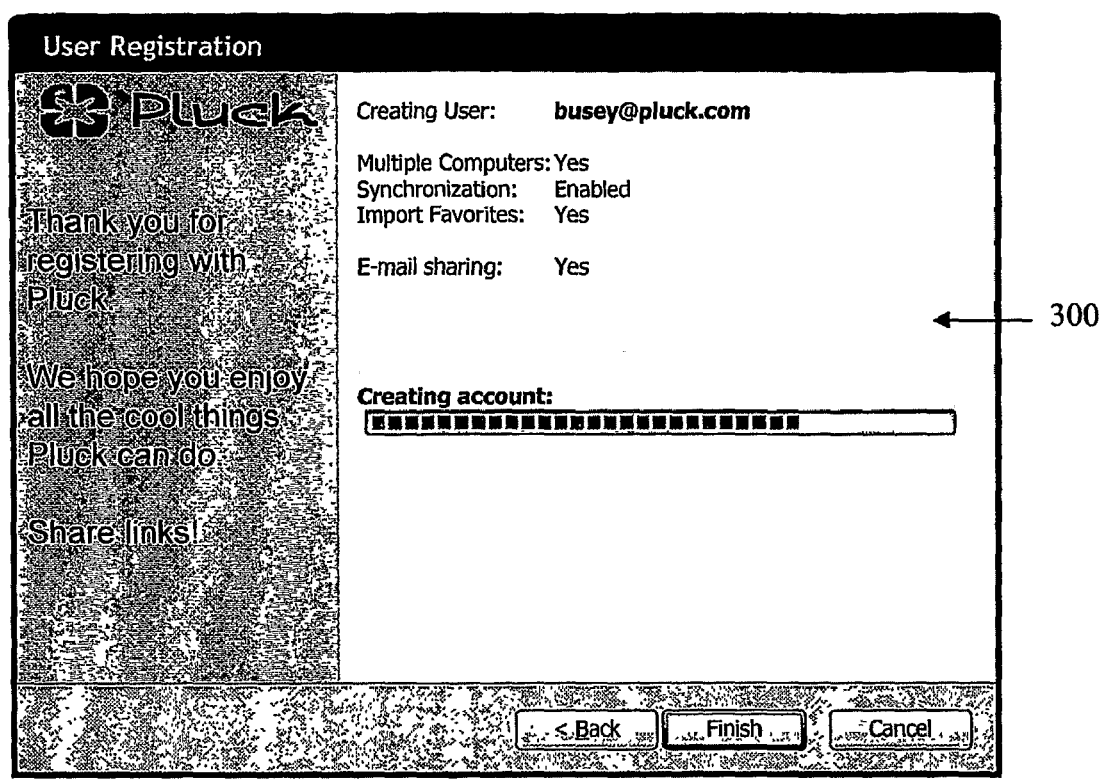
FIG. 3e is an illustration of a $5^{th}$ screen displayed by a display device of a representative client of FIG. 1.
Figure 4A:
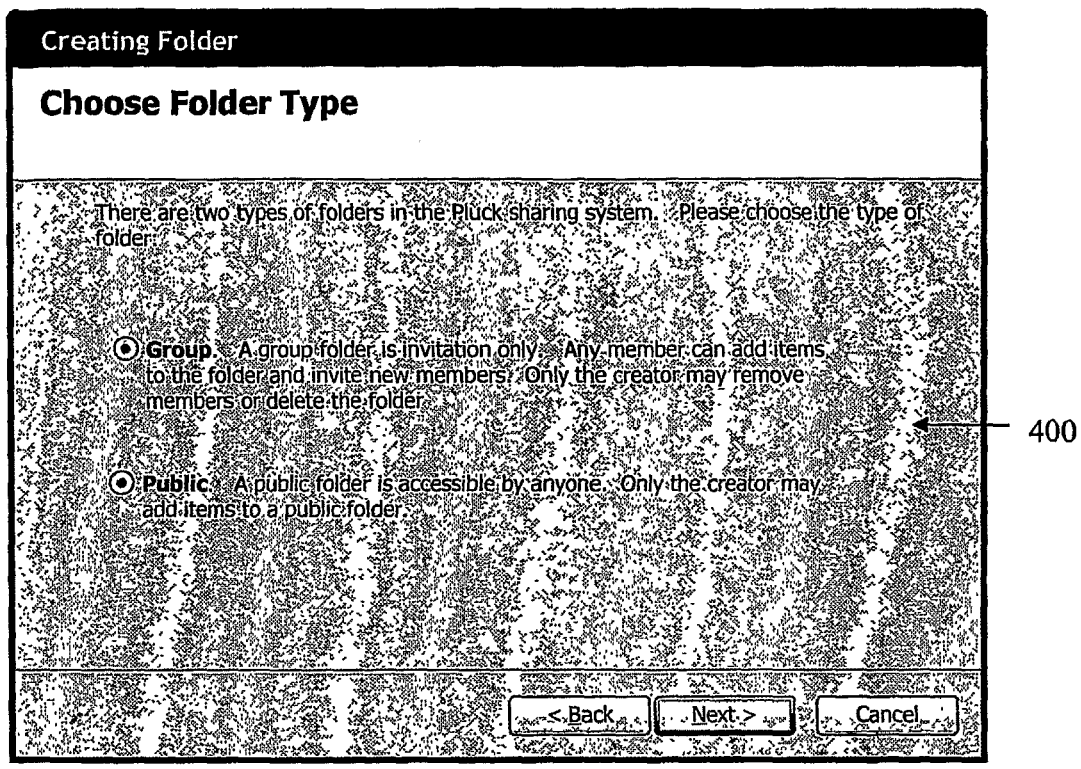
FIG. 4a is an illustration of a $6^{th}$ screen displayed by a display device of a representative client of FIG. 1.
Figure 4B:
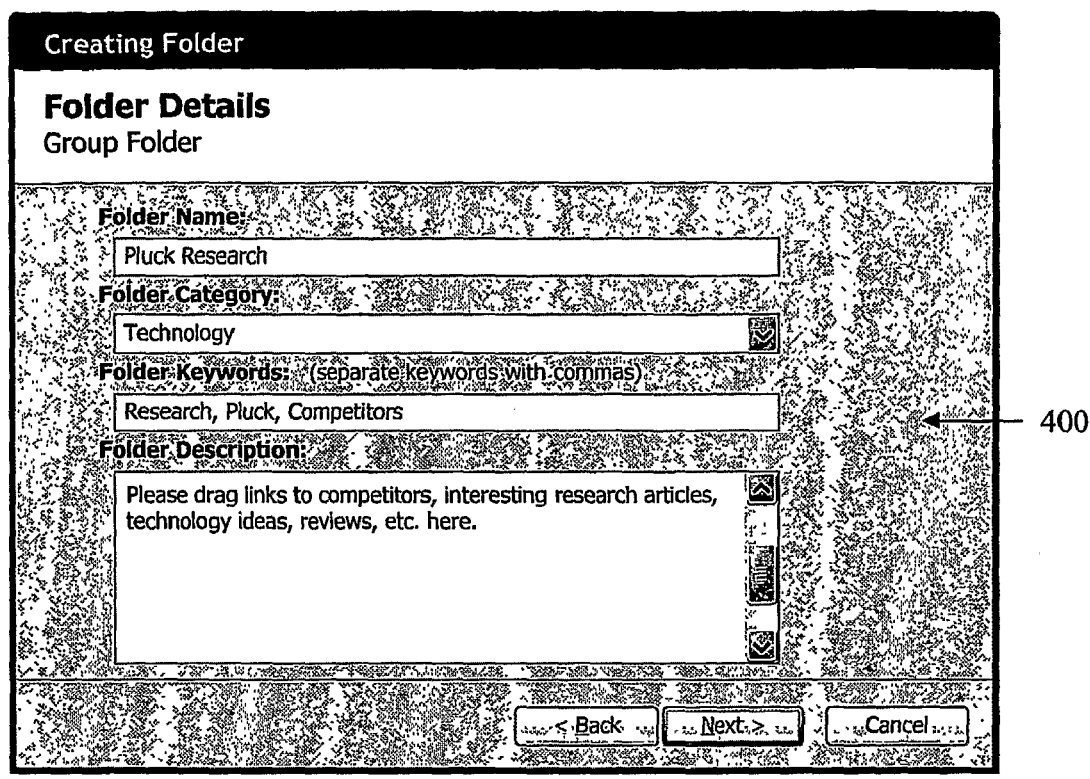
FIG. 4b is an illustration of a $7^{th}$ screen displayed by a display device of a representative client of FIG. 1.
Figure 4C:
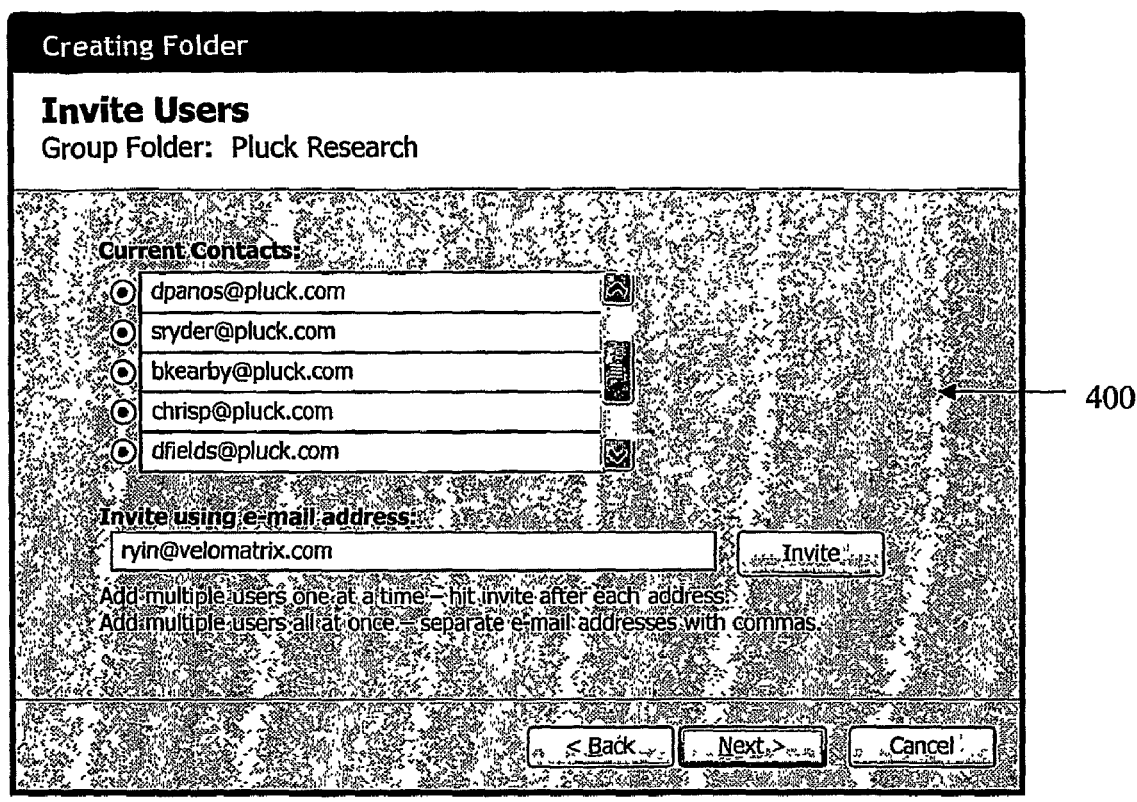
FIG. 4c is an illustration of an $8^{th}$ screen displayed by a display device of a representative client of FIG. 1.
Figure 4D:
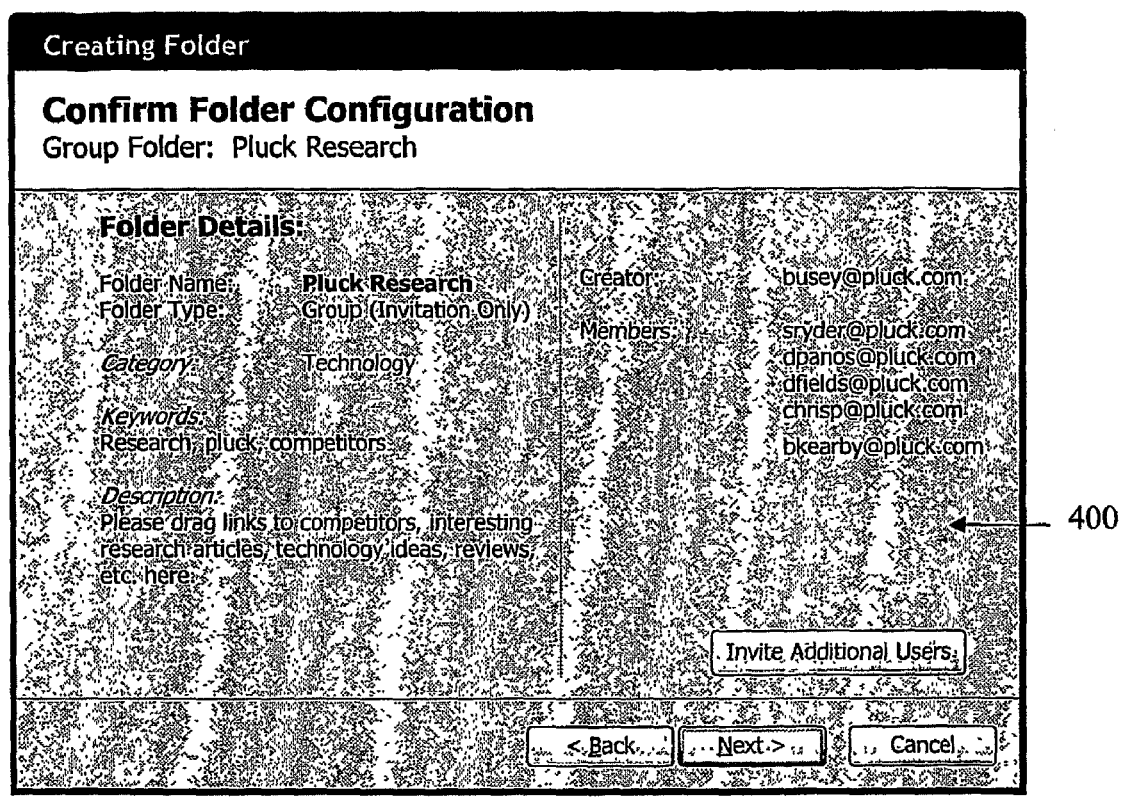
FIG. 4d is an illustration of a $9^{th}$ screen displayed by a display device of a representative client of FIG. 1.
Figure 4E:
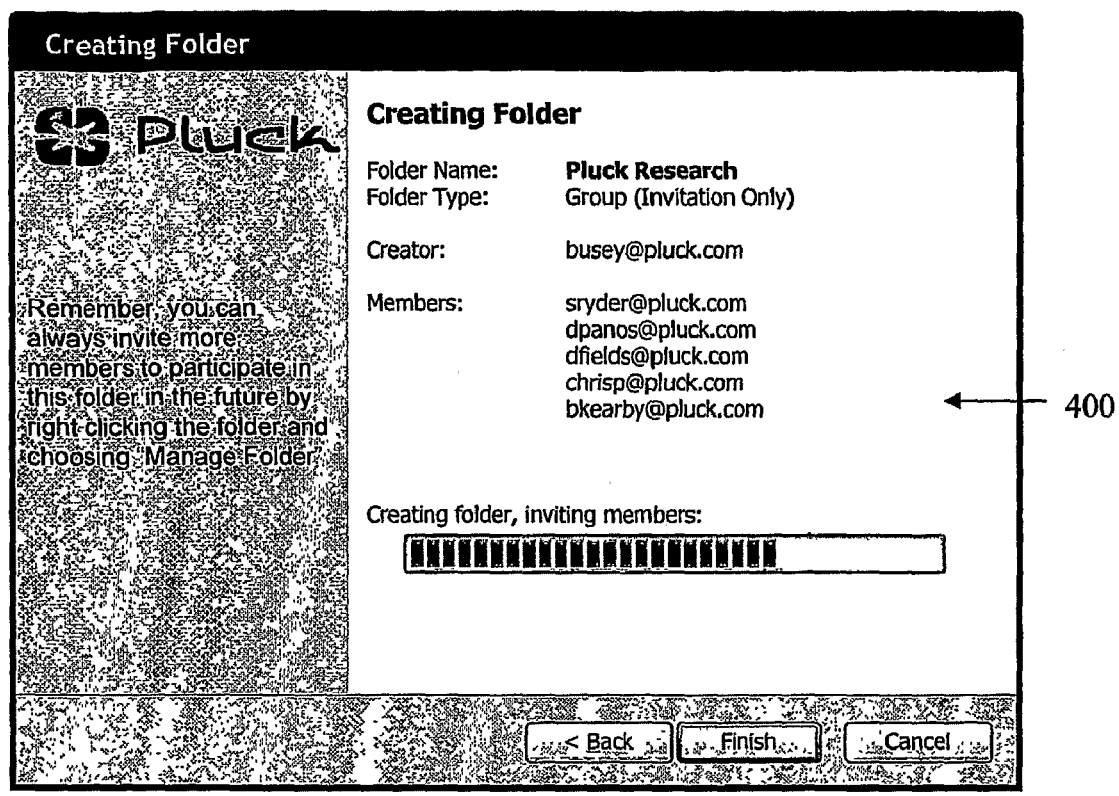
FIG. 4e is an illustration of a $10^{th}$ screen displayed by a display device of a representative client of FIG. 1.
Figure 4F:
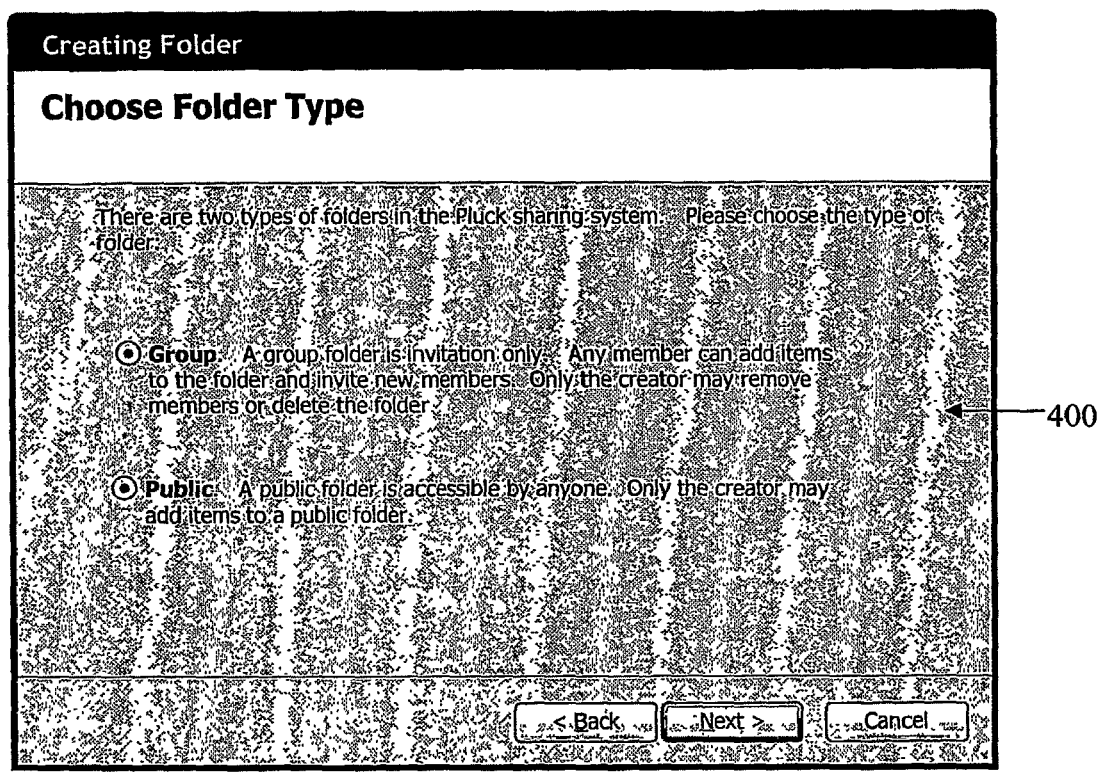
FIG. 4f is an illustration of an $11^{th}$ screen displayed by a display device of a representative client of FIG. 1.
Figure 4H:
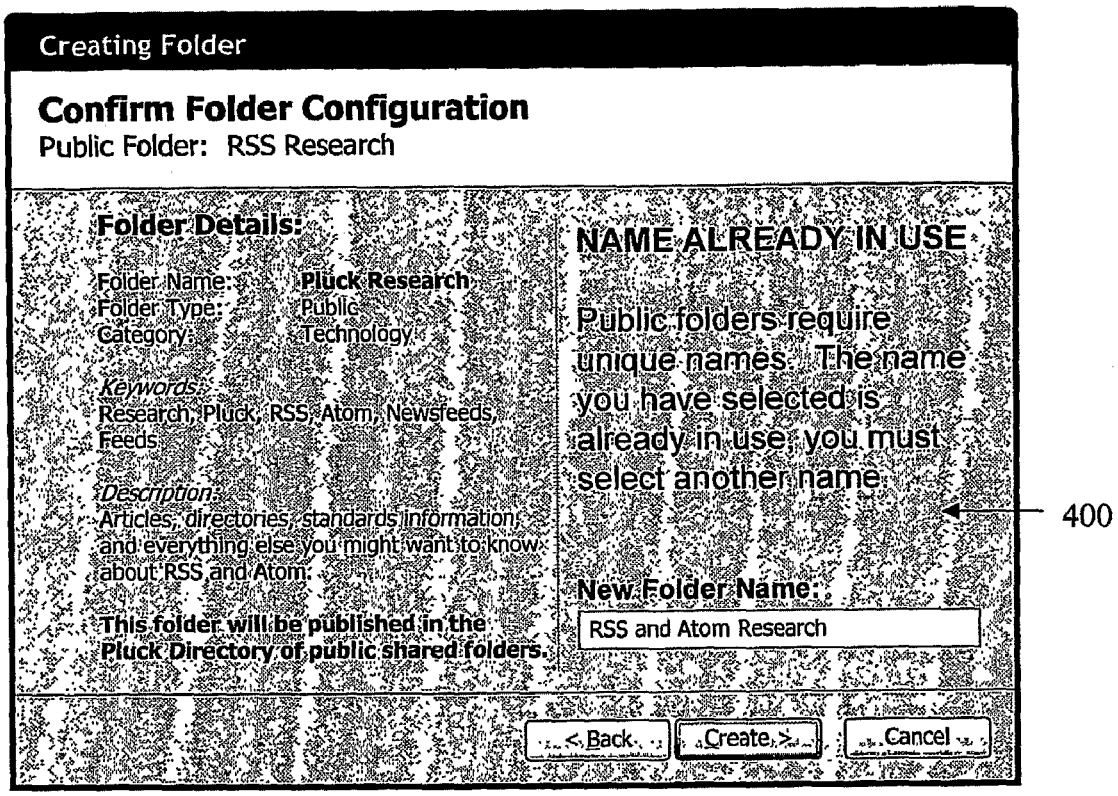
FIG. 4h is an illustration of a $13^{th}$ screen displayed by a display device of a representative client of FIG. 1.
Figure 4I:
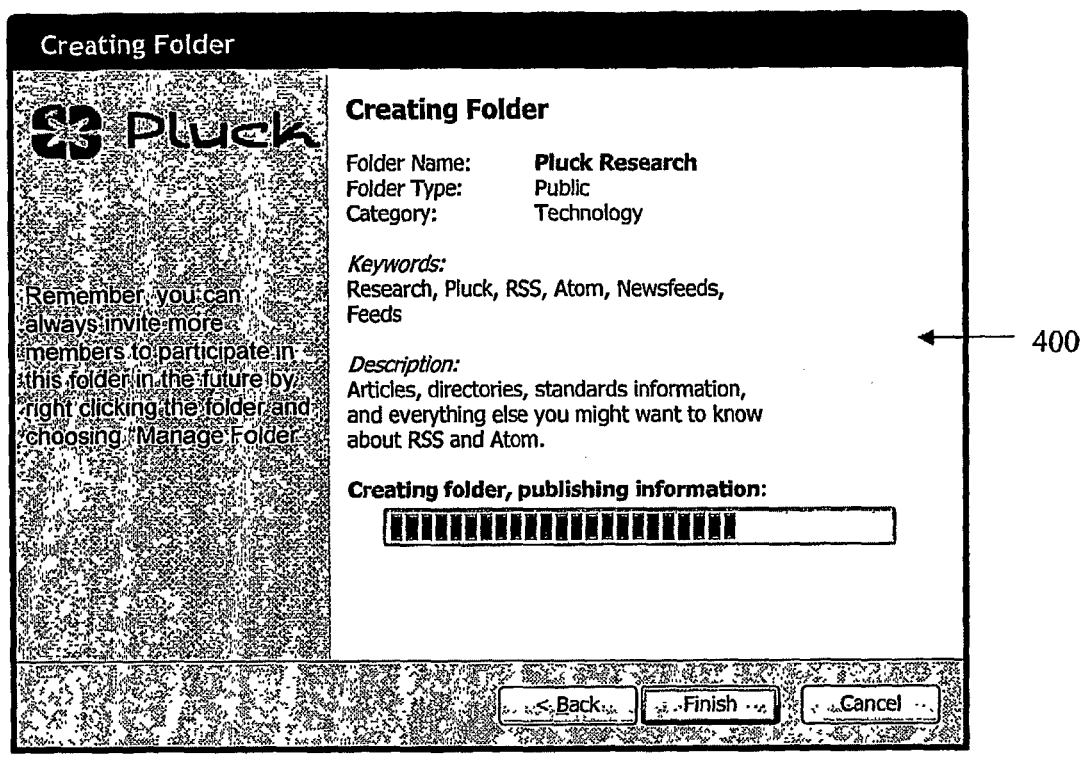
FIG. 4i is an illustration of a $14^{th}$ screen displayed by a display device of a representative client of FIG. 1.

FIG. 2 is a block diagram of a representative one of the IHSs of FIG. 1. Such representative IHS is indicated by dashed enclosure 200. In the illustrative embodiment, each IHS of FIG. 1 operates in association with a respective human user. Accordingly, in the example of FIG. 2, the IHS 200 operates in association with a human user 202, as discussed further hereinbelow.

As shown in FIG. 2, the IHS 200 includes (a) a computer 204 for executing and otherwise processing instructions, (b) input devices 206 for receiving information from human user 202, (c) a display device 208 (e.g., a conventional electronic cathode ray tube ("CRT") device) for displaying information to user 202, (d) a print device 210 (e.g., a conventional electronic printer or plotter) for printing visual images (e.g., textual and graphic information) on paper, (e) a nonvolatile storage device 211 (e.g., a hard disk drive or other computer-readable medium (or apparatus), as discussed further hereinbelow) for storing information, (f) a computer-readable medium (or apparatus) 212 (e.g., a portable floppy diskette) for storing information, and (g) various other electronic circuitry for performing other operations of the IHS 200.

For example, the computer 204 includes: (a) a network interface (e.g., circuitry) for communicating between the computer 204 and the network 110; and (b) a memory device (e.g., random access memory ("RAM") device and read only memory ("ROM") device) for storing information (e.g., instructions executed by computer 204 and data operated upon by computer 204 in response to such instructions). Accordingly, the computer 204 is connected to the network 110, the input devices 206, the display device 208, the print device 210, the storage device 211, and the computer-readable medium 212, as shown in FIG. 2. The computer 204 executes various software programs, such as an operating system and a web browser (as discussed further hereinbelow).

For example, in response to signals from the computer 204, the display device 208 displays visual images, and the user 202 views such visual images. Moreover, the user 202 operates the input devices 206 in order to output information to the computer 204, and the computer 204 receives such information from the input devices 206. Also, in response to signals from the computer 204, the print device 210 prints visual images on paper, and the user 202 views such visual images.

The input devices 206 include, for example, a conventional electronic keyboard and a pointing device such as a conventional electronic "mouse," rollerball or light pen. The user 202 operates the keyboard to output alphanumeric text information to the computer 204, and the computer 204 receives such alphanumeric text information from the keyboard. The user 202 operates the pointing device to output cursor-control information to the computer 204, and the computer 204 receives such cursor-control information from the pointing device.

The client 102's IHS and the server 108's IHS execute one or more respective processes for performing the operations described hereinbelow. For example, by executing the one or more processes, the system permits a user to share information about one or more websites (e.g., Internet sites or intranet sites) with one or more other users (e.g., by sharing information from such websites, or by sharing hyperlinks to such websites). Also, the system synchronizes among multiple IHSs, a stored list of user-designated hyperlinks that point to the user's favorite websites.

In response to a user selection, the server creates a user account for permitting the user to authenticate (e.g., "login") to the server from the client. After authenticating, the client enables its user to operate the system in various ways, including (a) creating a "public" folder to which the user can publish websites accessible by another user subscribed to the folder, (b) searching and/or browsing for one or more public folders and subscribing to such folders, (c) creating a "group" folder, to which an invited user is capable of publishing, and (d) sending a webpage's address (e.g., "link") to one or more other users. In response to receiving a user command for sending a link, the client outputs the link to a specified location (e.g., the receiving user's inbox). If the receiving user does not have an account with the server, then such user is a non-subscribing (e.g., unregistered) user, the client outputs the link in a suitable format (e.g., text or hyper text markup language ("HTML")) to the receiving user's IHS via a suitable technique (e.g., electronic mail ("e-mail")).

The system is capable of maintaining one or more folders, including a list of user preferred websites (e.g., "favorites"). The system is also capable of synchronizing the list among multiple IHSs of the user. Moreover, similar to maintaining the list of preferred websites, the system is operable to maintain a list of synchronized "contacts." The list of contacts is used in connection with the user transmitting an item (e.g., a link) of information to another user, or the user requesting (e.g., "inviting") another user to subscribe to a folder.

In response to the user authenticating to the server, the server executes one or more processes in connection with the operations described hereinabove. In response to the user failing to authenticate to the server, the server selectively directs the user to a previously determined website or executes a server specific process for performing one or more previously determined operations.

In the illustrative embodiment, the client executes a process for performing the search and/or browsing for one or more public folders. However, in another embodiment, the server executes the process.

In the illustrative embodiment, the client or the server is operable to deletes an item of information that is older than a previously determined period, or to receive a user selection for deleting an item of information older than a previously determined period. A number of items in a folder is also limitable by the client or the server.

FIG. 3a is an illustration of a visual image (e.g., "screen" or window), indicated generally at 300, displayed by a display device (e.g., display device 208) of the client. The screen 300 is a "registration" screen, for receiving a user's information (e.g., e-mail address, password) associated with the user's account. For example, screen 300 of FIG. 3a includes various fields for receiving user's e-mail address, password, and an indication of whether the user uses multiple IHSs.

In the following discussion, the client performs various operations in response to the client's execution of a software application. The software application is installed at the client for operation with the client's web browser application. In an alternative embodiment, the software application is installed at least partly (and, in one example, completely) at the server for operation with the client's web browser application, according to HTML or dynamic HTML ("DHTML") codes.

FIGS. 3b-e are illustrations of subsequent screens indicated generally at 300. Each of the screen 300 of FIGS. 3b-e is for receiving various other information associated with the user's registration, including one or more user selections regarding synchronization, sharing links with non-subscribing users, and inviting other users to subscribe.

FIGS. 4a-i are successive illustrations of another screen, indicated generally at 400, displayed by the display device of the client. The screen is a "folder" screen for specifying and displaying information about one or more folders associated with sharing. For example within each of the screens 400 of FIGS. 4a-i, the user is able to specify a folder's type, name, category, keywords, and description. Also, user is able to specify an initial list of users who are invited to subscribe to the folder.

Figure 5A:
FIG. 5a is an illustration of a $15^{th}$ screen displayed by a display device of a representative client of FIG. 1.

FIG. 5a is an illustration of a screen, indicated generally at 500. The screen 500 is displayed as a web browser window by the display device of the client, in response to the client's execution of plug-in software (discussed further hereinbelow) in association with web browser software. Accordingly, the web browser window includes a web browser region, shown in a right lower window "pane," for displaying content of a website (e.g., content of a webpage that is part of the website). Also, the web browser window includes folders 510 (e.g., folders of FIGS. 4a-i), shown in a left window pane. Further, the web browser window includes a content of a selected folder, shown in a right upper window pane.

Figure 5B:
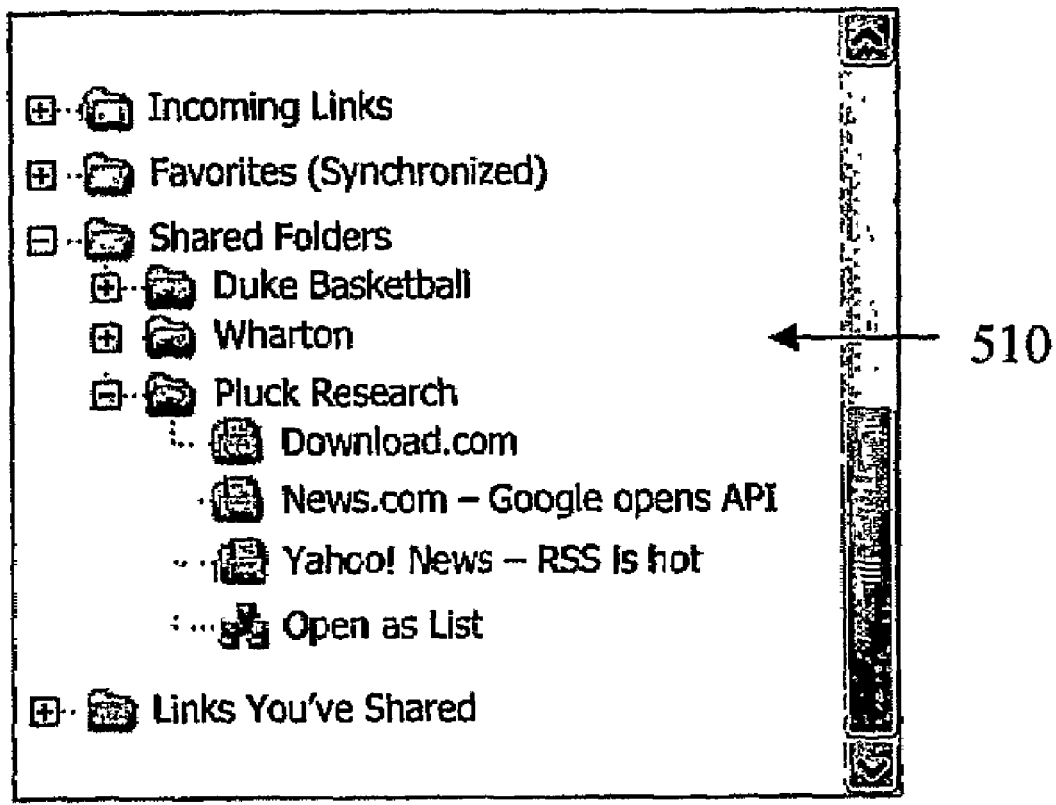
FIG. 5b is an illustration of a $16^{th}$ screen displayed by a display device of a representative client of FIG. 1.
Figure 6A:
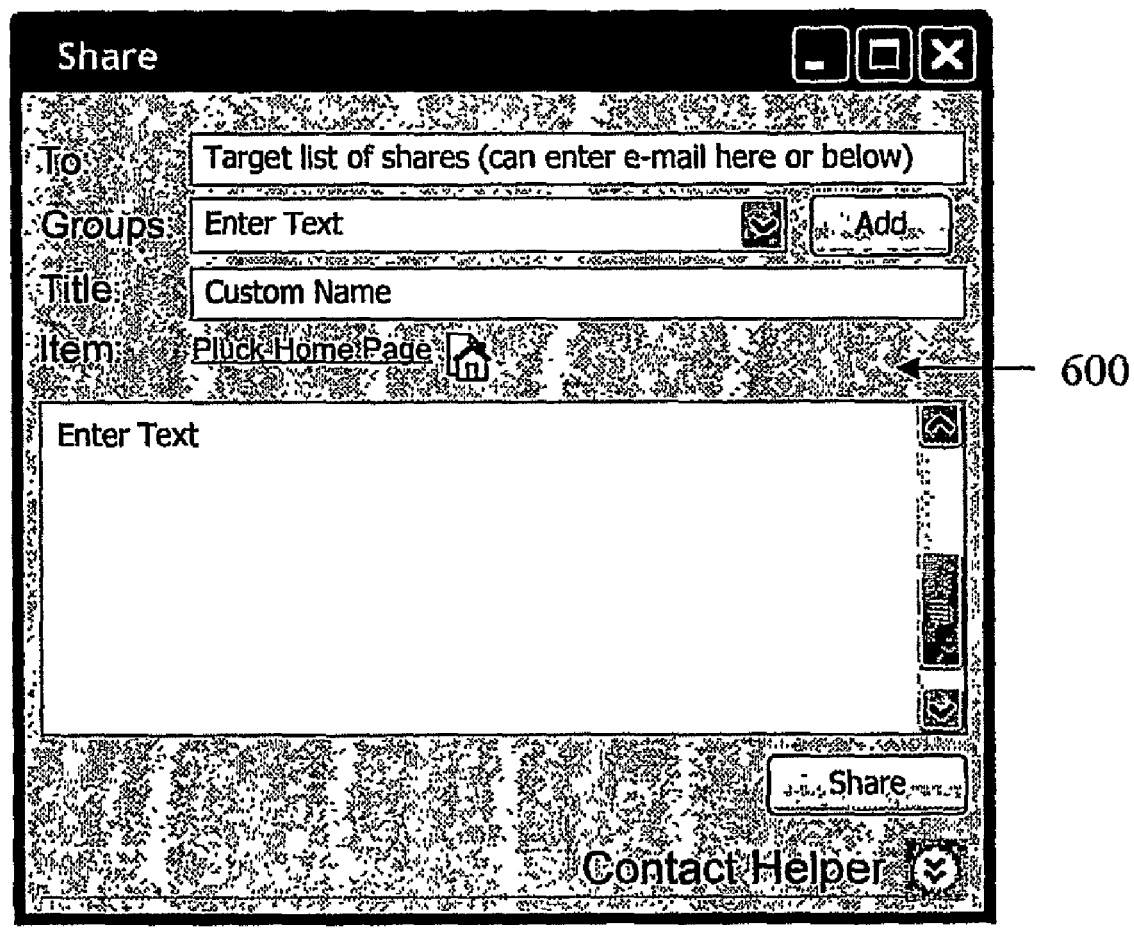
FIG. 6a is an illustration of a $17^{th}$ screen displayed by a display device of a representative client of FIG. 1.
Figure 6B:
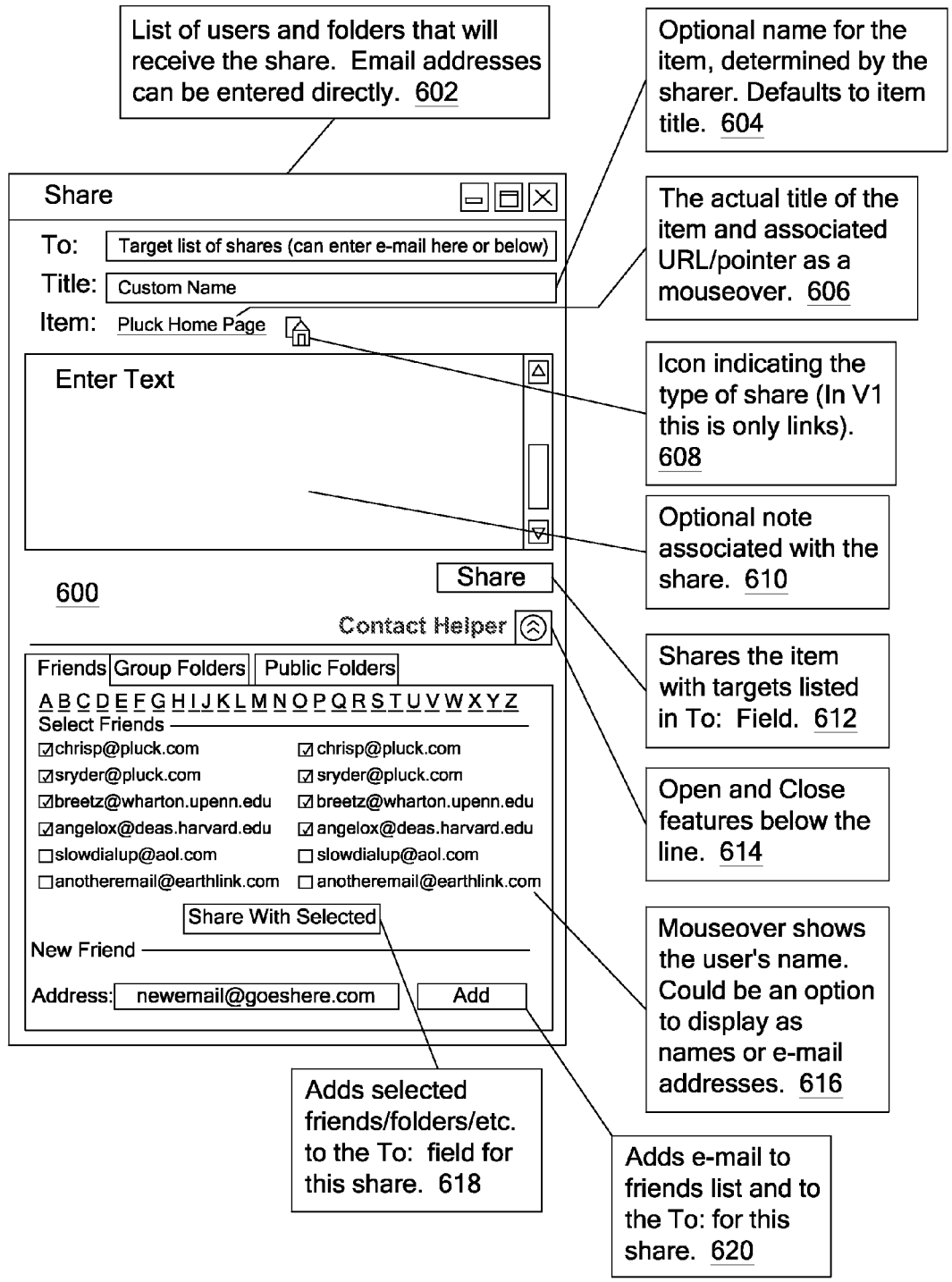
FIG. 6b is an illustration of an $18^{th}$ screen displayed by a display device of a representative client of FIG. 1.

FIG. 5b is a more detailed illustration of the left window pane of FIG. 5a. The left window pane includes the folders 510 of various types such as incoming links, favorites, shared folders, and links shared by a user of the client. In alternative embodiments, the left window pane is separate from the web browser window of FIG. 5a or operates according to HTML or DHTML codes.

FIGS. 6a-d are successive illustrations of another screen, indicated generally at 600, displayed by the display device of the client. The screen is a "share" screen for receiving information about one or more other users associated with sharing. In each of the screen 600 of FIGS. 6a-d, the user is able to specify various information, including one or more resources (e.g., group folders, public folders, links) to be shared, one or more users with whom the resources are to be shared and a text that is sent in association with the resources. Components 600 through 626 in FIGS. 6B-C reference various features of the screen 600.

In response to receiving information (e.g., e-mail address) associated with a user registration, the client executes a process for creating an account for the user. In one embodiment, such user selection is received in response to the user selecting (e.g., "clicking") an icon. In another embodiment, such user selection is received in response to a user making a selection within a user dialog box.

By executing the process for registering the user, the client outputs the screen 300 of FIGS. 3a-e for receiving from the user, information (e.g., the user's first name, last name, e-mail address, and list of initial users to invite). The server uses such information in creating a user account and creating an initial list of users to invite. Also, either the server or the client validates a format of the user's e-mail address. In response to the server or the client failing to validate the format of the e-mail address, the client outputs an indication of an error.

In response to receiving the information associated with registration, the client outputs the information to the server. Also, in response to the client failing to output the information to the server, the client outputs to a display device, an indication that the client failed to communicate with the server. In response to the client successfully outputting the information to the server and the server creating an account of the user, the client outputs to a display device, a such an indication. In another situation, if the client, after outputting the information, receives an indication from the server that a requested account already exists, the client also outputs such an indication.

After creating the user's account, the server transmits an e-mail message, including the user's password to the user's e-mail address. In one embodiment, the server authenticates the user in response to an e-mail address and a password manually entered by the user. In another embodiment, the server authenticates the user in response to a previously stored e-mail address and password of the user. The system automatically initiates the authentication operation, in response to receiving a user command to execute a process (e.g., computer program) for performing the various operations disclosed hereinabove. In both embodiments, in response to the client failing to perform the authentication, the client outputs one or more indications of error. Such errors include receiving an unrecognizable e-mail address and/or password, not being able to communicate with the server, and/or receiving an unexpected response from the server.

A subscribing (e.g., registered) user is able to selectively modify the e-mail address of record for the user's account. Modifying an e-mail address is sometimes suitable, for example, for a user whose e-mail address has changed. For performing the operation to change a user's e-mail address, the client displays a "change e-mail address wizard" screen. The system 100 permits any single user to create and maintain multiple coexisting e-mail addresses, which are useful for the same purpose or different purposes, according to the user's preferences.

In one embodiment, a screen (e.g., the screen 300) displayed by the client's display device includes a "general" tab. A portion of the tab is presentable for receiving a user selection for creating an account, and/or modifying the user's password. The client is also operable to automatically initiate a user authentication in response to execution of a computer program.

In the discussions hereinbelow, references to folders include references to folders of FIGS. 4a-i, FIG. 5a, and FIG.

5b. As discussed elsewhere herein, the server and/or the client is capable of storing user sharable items, including web links, searches, and/or feeds. An example feed is an RSS feed, such as: (a) a resource description framework ("RDF") site summary feed; (b) a rich site summary feed; or (c) a really simple syndication feed. The server and/or the client organizes such items in one or more "folders."

Example types of folders include "outgoing," "incoming," "public," and "group." Outgoing folders maintain one or more lists of items transmitted to other users. Incoming folders maintain one or more lists of received items that are shared with other users.

Public folders are available to the public and searchable by one or more users for their subscription. Public folders also include one or more links shared by the user with one or more other users. With a public folder that is created by a user, the client enables its user to perform various operations, including modifying the folder and inviting another user to subscribe to the folder. With a public folder that is not created by a user (e.g., the folder is created by another user), the client enables its user to access items in the folder, but other operations are achievable less readily.

A group folder includes items shared among two or more users as a group. A creator of a group folder is able to modify the folder's properties, however, other users are unable to perform such operations. However, both types of users are able to create items in the folder and invite one or more other user to subscribe to the folder.

A personal folder includes items that are synchronized among the user's two or more client IHSs. A favorites folder is a system level folder that is also a personal folder. By writing items of information (e.g., a user's favorite items) to a computer-readable medium, the server stores (e.g., saves) the items (e.g., links to web sites, feeds, and/or search results). Each of a user's favorite items is associated with one or more properties, including, the item's name, the item's source information (e.g., uniform resource locator ("URL")), and a comment about the item. In the illustrative embodiment, the list of a user's favorite items is storable on the storage device of the server. However, in another embodiment, the items are also storable on the client.

A "favorites" tab is associated with a system-level favorites folder, and the client enables its user to create a personal folder within the favorites system folder. A favorites folder is presentable in a first area of a screen (e.g., shortcut window pane). The shortcut window pane includes a first section and a second section. The first section includes information associated with organization of the items. For example the, first section includes information about directory structure (e.g., name of the directory and number of levels). The second section includes menu items for receiving user selections of adding an item to the folder, adding a new folder, or for receiving help.

A second region of the screen (e.g., left window pane) is presentable to the user for receiving a user selection by suitable user input techniques. For example, in response to the user "clicking" an item by pressing a left button of a mouse, the client displays the item in a third region of the screen (e.g. right window pane). In response to the user "clicking" the folder, a status of the folder toggles between "open" and "closed."

With an input device (e.g., a mouse), the client enables its user to "drag and drop" items from, into, and/or between folders (e.g., drag and drop content into a folder from a webpage or website of the screen 500). Also, in response to the user dragging an item into a folder, the client displays a dialog box for adding an item to the favorites folder.

In the illustrative embodiment, the client displays a menu in response to a user's "right button click" of an input device (e.g., a mouse), such as a user's "right button click" while the mouse's associated cursor is positioned over a user-selected portion of the webpage or website of the screen 500. The menu includes "add a favorite" item, which if selected by the user, displays a dialog box for adding an item (e.g., an item enclosed within the user-selected portion of the webpage or website of the screen 500) to the favorites folder. The menu also includes "share" item for displaying a dialog box (e.g., a dialog box of the screen 600) for receiving user selections associated with sharing items. Moreover, the menu includes delete selection, for deleting an item, and properties selection for displaying a dialog box for displaying properties of an item.

In the illustrative embodiment, a "button" is presentable to a user as part of a "toolbar" of a web browser (e.g., the Internet Explorer). In response to the user clicking the button, the client displays a dialog box for adding, modifying, and/or deleting items from a folder. The client enables its user to perform various operations, including specifying a comment, using the input device to drag and drop an item into a folder, and adding a new folder.

The dialog box includes one or more fields for receiving, from a user, information associated with adding an item to a favorites folder, including a name of an item, a URL of the item, and a comment about the item. In response to the client failing to perform an add operation, the client outputs an indication of such an error. In one example, the indication includes a text message displayed on a display such as "failed to add folder, please try again."

Also, the dialog box is for receiving information associated with adding a new folder. The client enables its user to add a folder by selecting a "task" icon or by a "right button click." The system sets a context to "root" if the user command is received via the "task" icon. Conversely, if user executes a command by a "right button click," the server sets the context to the folder which the user has "clicked." The dialog box displays information about the context. In response to failing to add a folder, the client outputs an indication of error.

The server stores one or more shared items in its hard disk. During its operation, the client stores the relevant shared items (stored on the server) in its volatile memory. In an alternative embodiment, the client stores the one or more shared items in its hard disk.

One or more shared items are presentable in a "short cut" window pane named "sharing." In presenting the shared items, the client uses left and right window panes. In the left window pane, the short cut includes two sections, namely a tree control section and a task section. The tree control section includes one ore more sharing folders. The sharing folders are "virtual" folders for storing public and group folders that the user has created, or to which the user is subscribed. Shared items are stored in folders.

The tree control section includes incoming and outgoing folders. The client displays a name of each of the folders. Also, the client displays a distinct icon for the various folders of different types.

The task section includes a menu item for adding a folder. In response to a user selecting the menu item, the client displays a dialog box. The section also includes a menu item for finding one or more public folders, managing (e.g., add, modify, delete) contacts, inviting other users, and for accessing a help document.

In the left window pane, the client enables its user to use an input device for making a user selection by suitable input techniques, including "clicking," "dragging and dropping,"

and "right button clicking." In response to a user clicking a folder in the left window pane, the client displays the contents of a folder on a right window pane. In response to a user dragging an item into a folder, the client displaying a dialog box for sharing the item in association with the folder. By clicking a right button of a mouse, a user is able to add a folder, invite another user to subscribe to the folder, delete a folder, and/or view properties of the folder or an item therein.

The right window pane includes a "list view" and a "preview browser." In response to a user clicking a folder in the list view, the client displays a list of items and in response, also to the folder's type. For example, types of the items includes incoming, outgoing, and public/group. The incoming and outgoing items include a received date, a from field, and a title. The public/group item includes an added date, a title, and a comment.

By clicking on an item in the list view, the client displays a target URL in the preview browser. One or more functions of the preview browser are substantially similar for RSS feed items.

The right window pane includes an icon (e.g., "share" icon) on a toolbar of the preview browser. In response to a user clicking the icon, the client displays a "share" dialog box associated with the item selected for display by the user. In another embodiment, the icon is displayed in a toolbar of web browser software. In both embodiments, the icon is selectable by the user in response to the web browser program pointing to a resource that is not stored by the hard disk of the client.

An "add a folder" dialog box is presentable to the user for receiving a user selection to add a new folder. In the illustrative embodiment, in response to receiving a user command to add a folder, the system creates a folder at a root level of a directory. Via the dialog box, the client receives information, including a type (e.g., public or group) of a folder designated for creation. For a public folder, the client or the server receives and stores information, including a name, a category, keywords, and a description. For a group folder, the client or the server receives and stores its respectively associated information, including a name, and a description.

For either type of folder, the client enables its user to invite one or more users to share items within the folder (e.g., by subscribing to the folder). The user specifies such "target" user by outputting the users' e-mail address to the client. In response to receiving an incorrectly formatted e-mail address, the client is capable of outputting an indication of error. In response to the client failing to perform an operation to add a folder, the client outputs to a display device, an indication of error.

For inviting one or more other users, the client displays the "share" dialog box. Via the share dialog box, the user specifies a user who is invited to share or subscribe to a folder or an item. For each item to be shared, the user is able to specify, a title, a URL, and a description. The share dialog box also includes a share button, selectable by the user to initiate the sharing. In response to the client and/or server failing to perform the share operation, the user receives a message indicating an error.

For managing one or more contacts (e.g., contacts with whom the client enables its user to share items), the client displays a "manage contacts" dialog box. Via the manage contacts dialog box, the user adds, deletes, and/or modifies one or more users' contacts. Also via, the manage dialog box, the user outputs and the client and/or server receives information (e.g., e-mail address) about a contact. For each add, delete, or modify operation, the client displays a message indicating an error in response to the client and/or the server failing to perform the operation. The client and/or the sever is/are capable of manage contacts by organizing the contacts into groups, and also by referring to each contact by the contact's alias.

For a group folder that is created by a user, the client enables its user to edit fields (e.g. name, description), view the folder's members (e.g., users that have access to the folder), and inviting one or more other users. For a group folder that a user is a member of, the user is not able to edit fields. However, the user is able to view fields as "read only" information. The user is also able to see a list of members for the folder. Moreover, the user is able to invite one or more other users to become members of the group by specifying the users' e-mail address. The client and/or the server is/are capable of validating an e-mail address for format of the e-mail.

With a public folder, into which, a user publishes, the user is able to modify one or more fields (e.g., name, category, keywords, description) associated with the folder. The user is also able to invite other users to subscribe to the folder. However, the system is capable of preventing the user from viewing the members of the folder.

For a public folder, for which a user is merely a subscriber, the user is able to view one or more fields associated with the folder. Also, the user is able to invite one or more other users. For both types of public folders, a user invites one or more other users by specifying the users' e-mail address. The client and/or the server is/are capable of validating an e-mail address's format and outputting an indication of error in response to the e-mail address failing the validation.

For performing the operations described hereinabove, the server executes one or more processes (e.g., a sharing server). Through the sharing server, clients share various types of web information between users, IHSs, and/or folders, in response to: (a) user commands; and/or (b) instructions of an e-mail message application or another application (e.g., client-executed application). Such web information includes one or more excerpts (or "snippets") of general XML-formatted information. Accordingly, the sharing server receives, identifies, stores, outputs and/or retrieves various information, in association with such sharing operations.

The sharing server performs (and, in doing so, enables users to perform) various operations associated with items, as described hereinbelow in Table 1.

TABLE 1

Example Types of Operations.

| Operation | Description of Operation |
|---|---|
| User-to-User XML Sharing | Includes a first user's sharing of links, search results, RSS feeds, and other web information with a second user. In one embodiment, the interface includes a "drag and drop" operation. |
| User-to-Folder XML Publishing | Includes a user's publishing of information to a folder. The folder is configurable by the folder's creator, so that access is limited to specified |

TABLE 1-continued

Example Types of Operations.

| Operation | Description of Operation |
| --- | --- |
| | users (e.g., named users invited by the folder's creator, or a class of users invited by the folder's creator). |
| Public Folders | Includes a folder that is designated "public" by the folder's creator. Any user is capable of searching for public folders and subscribing to them. |
| IHS-to-IHS web information synchronization | Includes synchronizing of information (e.g., lists of favorites, and RSS subscription lists) between multiple IHSs. |

In the illustrative embodiment, various processes for performing the operations described hereinabove in connection with Table 1 and elsewhere herein, are executed on the server to reduce a load on a client's resources (e.g., processor, storage device).

For example, a shared item (or "share") is suitable for sharing in extensible markup language ("XML") format, such as a snippet of XML-formatted information ("XML snippet" or "XS"), which is an instance of a shareable item. Various types of instances are described hereinbelow in Table 2.

TABLE 2

Example Types of Instances.

| Instance | Description |
| --- | --- |
| Message | A message is text, which is associable with one or more other types of instances. |
| Link | A link is a web hyperlink, which is associable with a message. |
| Thread | A thread is a text discussion between multiple users (e.g., threaded chat), which is associable with one or more other types of instances. |
| Bucket | A bucket is a non-volatile folder, suitable for containing a message and one or more other types of instances. |
| Item | An item is suitable for containing a message, a link, and/or general XML-formatted information (e.g., music playlists, as stored in one or more files). |
| Feed | A feed is an RSS feed from a specified URL. |
| Search | A search is a target search, which is attachable to a set of search results. |
| Perch | A perch is a pointer to a target. In response to the perch, the system identifies any change in the target, such as by: (a) receiving a feed; (b) performing a search; or (c) otherwise reviewing information from a specified URL. In response to the change, the system updates a "last results" set, which includes the most recent information from the target. |

The client enables its user to have one or more shared items ("SI"). Such SIs include SIs (e.g., favorite items) that are used by the user. The client and/or server is/are capable storing such SIs for synchronization among the user's various IHSs. Such SIs also include pointers and update flags to shared folders, to which the user is subscribed. Accordingly, the number of queries is reduced, because each user need not query a shared folder for updates. In one embodiment, the list is stored in a stack. In another embodiment, the list is stored as a record in a database.

A shared list is a shared folder that has is not likely to be dynamically updated. A shared list is suitable for including various types of SI, or for being shown as an "add-on" to a web search, or for serving as initial information for a more advanced search engine or another process associated with sharing.

In association with the sharing server, a user is identified via one or more e-mail addresses. The system 100 stores a user's information (e.g., in a stack or a database record). For clarity, the following discussion references such stored information as user's shared items ("USIs").

USIs incorporate folder subscriptions in the stack or the record and includes folder update markers (discussed in more detail hereinbelow). In another embodiment, there is an independent folder subscription list for each user.

In response to initiating a sharing of information (or "share") to a user, the server performs the following operations. The system responds to a request to verify that the user is subscribing (e.g., the user has an account with the server). If the server determines that the user is non-subscribing, the system performs the operations described herein below.

For sharing with a user that is non-subscribing, the server outputs an e-mail message. The e-mail message includes information for indicating that such message is not an impermissible "spam" message, and for indicating an abuse-reporting procedure that is available to the user. For a user who initiates a share with a non-subscribing user, the share operation functions in a manner substantially similar to the share operation with a subscribing user. The e-mail message also includes a request for the non-subscribing user to create an account with the server. Moreover, the e-mail message includes share items (e.g., links, search results) in text or HTML format.

In one embodiment, according to preferences of the subscribing user and/or the server's operator, the system either: (a) notifies the subscribing user on the first occasion when the subscribing user asks the system to share information with a non-subscribing user; (b) notifies the subscribing user on each occasion when the subscribing user asks the system to share information with a non-subscribing user; or (c) does not notify the subscribing user on any occasion when the subscribing user asks the system to share information with a non-subscribing user. Moreover, one version of the system asks the subscribing user for permission before sending the e-mail message to the non-subscribing user.

In addition to sending the shared information to a non-subscribing user in an e-mail message, the server stores the shared information, so that such information is available for such user's subsequent access if such user becomes a subscribing user.

If the server determines that the user is a subscribing user, the server determines whether the sending user is on the receiving user's "ban list" (e.g., "squelch" list). If the server determines that the sending user is not on the list, the message is added to the user's USI. For sending a shared item to a group, a user has an associated group information (e.g., identification ("ID")). For example, the group ID is determined when the group is formed. The group ID is suitable for identifying a list of users who are members of the group.

A user's record is suitable for maintaining a list of other users to whom the user has shared information through non-public folders and direct sharing. The list is expandable to form a personal network.

In context of the sharing server, a folder is substantially identical to the USI. However, there are differences. For example, a folder is maintained separately and referenced by a unique ID. A folder is also represented by a folder icon. Moreover, a folder has a functional overlay for alerting its subscribing users of an update. Also, a folder is capable of being made public.

A folder's access control list ("ACL") includes a user's ID, and a user's permissions. For example, the client enables an owner user (e.g., a user who is owner/creator of a folder) to perform all available operations, including transferring owner status. The client gives an administrator user similar rights as an owner, but an administrator is prevented from modifying an owner's rights. The client enables a member user to publish items and invite other users with equal or lower levels of permission. Similar to the member, the client enables a participant user to publish and invite other users with equal or lower levels of permission. The client enables a spectator user to subscribe. Also, the system is programmable, so that a folder performs certain operations automatically in response to certain types of actions (e.g., add to calendar).

An XML snippet is an XML-formatted representation of a shareable item. XML snippets have associated document type definitions ("DTDs"). However, they are treated as snippets inside of the shared server. Accordingly, as stored in the server, such XSs are "typed" (e.g., the server identifies their type without parsing their XML-formatted tags), so that client/server XS-specific applications are more efficient and responsive in processing such XSs. Design decisions around XS substantially influence other design decisions. For example, if information associated with an XS is stored in a raw format in a database, the information requires an XML-formatted tag for writing the information to and reading the information from the database.

A user views a representation of an XS in the form of SIs. Moreover, a user's USI includes a list of XSs. A search's XS contains the search's results in structured XML format, with result-by-result markers to identify whether (and which) results have been viewed by the user.

In designing DTDs for each SI type, descriptive tags are suitable for the XML snippets. However, the size of the XML-formatted information is capable of impacting system performance. For example, longer element tags potentially take more time for the system to parse, increasing processor utilization and lowering response time. Such delay also impacts transforms. Also, a longer element is capable of impacting an XS's size, resulting in increased use of bandwidth, storage device utilization, and access time.

In one embodiment, XML-formatted information is tokenized on the client, and the server executes the tokenized version. In one example, tokenizing includes reducing a tag to one character, and eliminating "<," ">" and a tag name. In another embodiment, one character tag in conventional XML-formatted information is used. With such enhancements, the system 100 processes XML-formatted information with less overhead, so that bandwidth requirements and storage requirements of the system 100 are reduced.

In the illustrative embodiment, the system displays a screen (e.g., the screen 300) for creating or modifying a user's account. The system displays the screen on the client's associated display device, in response to instructions executed by either the server or the client. Also, the system transmits suitable e-mail message to subscribing users and non-subscribing users, including related information (e.g., password recovery information) about their respective subscriptions to the system's services.

Moreover, the system is operable by a user to selectively create and/or modify folders associated with the user's account. The system performs such operations in response to instructions executed by either the server or the client. In creating and/or modifying folders, the system creates and/or modifies suitable access control lists in response to the user's specified preferences. The ACLs specify: (a) other users who are authorized to access such folders; and (b) levels of permission granted to such authorized users. For example, the ACLs are capable of specifying that a particular folder is a public folder. Also, the system transmits suitable e-mail messages (or other types of messages) for inviting such authorized users to read from, write to, and/or subscribe to such folders.

The system updates the users' information (e.g., contact information) in a variety of ways, including: (a) automatically updating at particular times by reading information from a particular storage device; (b) outputting messages to users, asking the users to supply updated information; and (c) updating in response to a user-initiated command.

In response to an XML snippet ("XS"), the system is operable to: (a) post (e.g., send) the XS to one or more specified users, to the extent that such posting is permitted by such users; and/or (b) post (e.g., write) the XS for storage in one or more specified folders, to the extent that such posting is permitted by users that control such folders (e.g., as permitted by ACLs).

In an example operation, in response to a user's request (which the user outputs to the server by suitably operating a client), the server creates an account for the user. In creating the user's account, the server outputs an e-mail message to the user, in order to verify the user's e-mail address (e.g., by specifying a necessary account password in the text of the e-mail message). After the user's account is created, the user operates a client to output a request for connection to the server.

In response to the request, the server authenticates (e.g., verifies an identify of) the client and/or the client's user (e.g., by asking the user to specify the account password). After the client connects to the server, the client downloads updated information from the server, including: (a) items shared with the client by other clients; (b) public folders to which the client's user is subscribed; and (c) information that is updated as part of a synchronization operation, which copies revisions that the client's user made while previously operating a different client.

Such updated information is downloaded from the server to the client on a periodic basis. Also, at a suitable moment, such updated information is downloaded from the server to the client shortly after: (a) a refresh operation is requested by the client or the client's user; or (b) a different client's user specifies updated information (e.g., by specifying a new link to be shared and/or added into a particular folder). After the user logs off (e.g., ends a session), the server and client perform a synchronization operation shortly thereafter at a suitable moment, so that the user's revisions are copied to the server. In an alternative embodiment, the server and client perform a synchronization operation during the session, which is especially helpful if a user is operating multiple clients during concurrent sessions. If the volume of updated information is large, the updated information is transferable between the server and client in a staggered manner.

Irrespective of whether users have subscribed to the system, a subscribing user is able to share information with non-subscribing users and/or with other subscribing users, without experiencing a difference in the overall ease of sharing such information with them. In one embodiment, if the subscribing user asks the system to share information with a non-subscribing user, the system sends the non-subscribing user an e-mail message, which: (a) contains the shared information (e.g., hyperlinks and search results) in HTML format; and (b) invites the non-subscribing user to become a subscribing user. For example, the system is able to transform XML-formatted information into readable HTML-formatted information for inclusion in the e-mail message. If the non-subscribing user accepts the invitation and becomes a subscribing user, the user is able to use a wider array of the system's features that share information among multiple other users.

In one embodiment, according to preferences of the subscribing user and/or the server's operator, the system either: (a) notifies the subscribing user on the first occasion when the subscribing user asks the system to share information with a non-subscribing user; (b) notifies the subscribing user on each occasion when the subscribing user asks the system to share information with a non-subscribing user; or (c) does not notify the subscribing user on any occasion when the subscribing user asks the system to share information with a non-subscribing user. Moreover, one version of the system asks the subscribing user for permission before sending the e-mail message to the non-subscribing user.

In addition to sending the shared information to a non-subscribing user in an e-mail message, the server stores the shared information, so that such information is available for such user's subsequent access if such user becomes a subscribing user.

In the illustrative embodiment, the system processes and stores a first user's XML-formatted search result (or other structured information that relates to web pages or other activities), so that the first user (and/or any one or more second users) can subsequently view the identical search result upon request, from the same client or different clients. Moreover, the system marks the search results as being either viewed or unread (e.g., by marking any viewed search results with a different color). In that manner, the system tracks whether users have actually viewed the search results, so that users may view different portions of the search results at different times, without forgetting the portions that have previously been viewed. Further, in sharing the search results, the system permits the user to readily specify that only viewed portions are to be shared, and/or that only unread portions are to be shared.

In one embodiment, the server and/or the client performs user authentications in association with one or more commercially available directory system (e.g., Microsoft Active Directory) or through a database using web services. The server and/or the client are also able to limit connections between the server and the client, and determine an operation to perform in response to a disconnection.

The server and/or the client perform various operations associated with queries. For example, the server and/or the client are able to limit or delay a client's number of requests, such as a client's requests for authentication and/or updates during higher traffic periods. Moreover, the server is able to transmit a notification of new updates to the client by a directory system and/or by using multiple IHSs.

In one embodiment, the server performs its operations in association with a file system for scalability, to reduce conversion of XML-formatted information on the server. Also, the server performs operations using extended hyper text mark up language ("XHTML") to form a user and/or folder's record. In such an embodiment, the server uses database to maintain states and statistics.

Also, the server is capable of using conventional search engine techniques for indexing files of the file system. By creating an internal web rendering, files become searchable. Moreover, the server in such an embodiment is capable of using web statistics engines for monitoring an application server.

Figure 7:
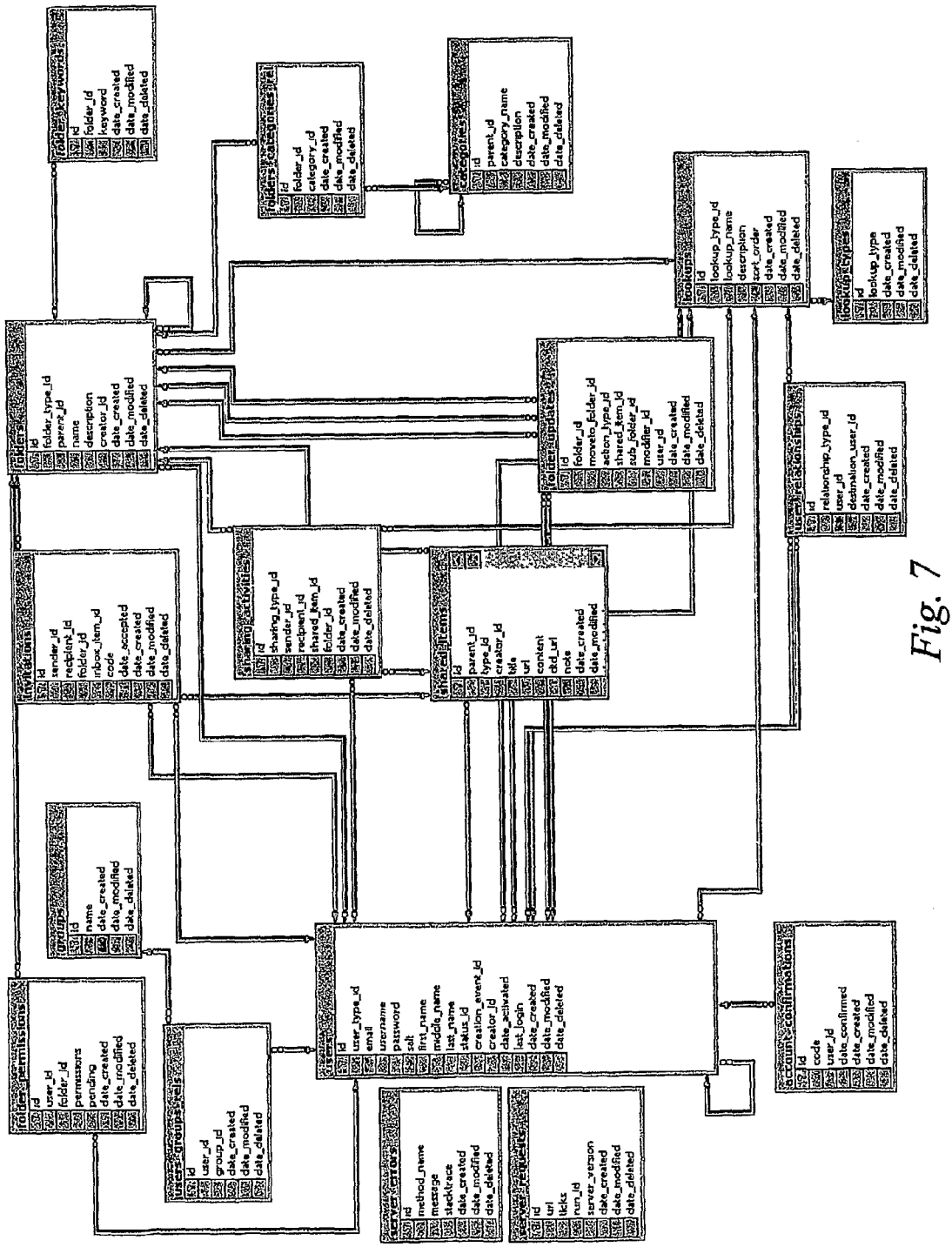
FIG. 7 is an illustration of a database table of the system of FIG. 1.

FIG. 7 is an illustration of a database table of the system of FIG. 1. In the illustrative embodiment, the server performs its various operations in association with a database, such as the database table of FIG. 7. In another embodiment, the server performs its various operations in association with both a file system and a database.

The database table of FIG. 7 stores the users' respective information, folders and other related information (e.g., permission information). By using such a table, the system 100 is implemented and managed with more ease, but perhaps with less scalability and overall speed, in comparison to using a file system.

In an alternative embodiment, the system 100 performs its various operations in association with a stack, instead of a database table. For example, in such an alternative embodiment, if a user designates an item to be shared with a different user, the item is stored in the different user's stack. Information stored in the stack is sequential. Accordingly, in response to the different user's subsequent authentication, information is received (e.g., downloaded) by the different user's IHS (e.g., information that was stored in the stack after a previous check point).

If an item to be shared is in a folder, the item is stored in the folder's stack. In response, the folder's stack stores the item in a target user's stack. In response, the client receives the item from the folder. However, if a folder is public, the client performs periodic queries to determine whether updated items are available.

For example, if a user subscribes to a new folder, the client enables its user to make a request for prospective new items, the new items in addition to a set of previous items, or all items (e.g., the entire stack). In one example, a user stack includes seven items. If the client has already received items up to item 4, and requests for an update, the server outputs items 5 through 7 from the stack. If an item (e.g., item 6) is a folder update alert, the client transmits a request to the server for an update on the folder associated with item 6.

A user's stack, including a list of "shared favorites," operates in a manner substantially similar to the user's "share" stack. For example if a user authenticates to the server using a first client IHS, and the user creates a list of favorites including four (4) items, the stack on the server includes information associated with the four (4) items. Subsequently, in response to the server authenticating the user from a second client IHS, the second client IHS receives the four (4) items in the stack. If in addition, the user adds two more favorite items and deletes one of the 4 previous items (e.g., item 4), the server stores the two new items in the stack locations 5 and 6. In the stack location 7, the server stores an indication that the item 4 is deleted. Accordingly, in response to the server authenticating the user from the first client IHS, the first client IHS receives from the server, the new items in 5 and 6, and deletes the item 4 as indicated in the stack location 7. In response to the server determining that the all client IHSs of the user reflect the information stored in the stack, the server deletes the items 4 and 7 (e.g., add/delete pair) from the stack.

For searching a company's website, the company is able to install enterprise search software on its information handling system. Likewise, the company is able to install a web services software package on its information handling system. In response to one or more web services calls from other information handling systems ("calling systems") that are remotely connected to the company's website through the network 110 (e.g., web services calls from one or more other websites), the company's information handling system (according to instructions of the web services software) automatically searches the company's website and outputs the search results to the calling system(s). By processing web services calls in that manner, the company's website does not require a manual entry (and manual initiation) of search queries via an HTML web browser.

In the illustrative embodiment, the representative client 102 executes web browser plug-in software ("plug-in") for performing the various client operations discussed hereinabove. Initially, the client downloads (e.g., receives) the plug-in software from a server (e.g., the server of server 108) through network 110 (e.g., in response to a command from a user, after the client's web browser accesses a particular webpage). After downloading the plug-in software, the client installs the plug-in software in association with web browser software ("web browser"), so that the plug-in software interoperates with the web browser to enhance the web browser's resource sharing operations.

Various web browsers are available for accessing the Internet from a computer system, such as Microsoft's Internet Explorer® ("IE") browser, Netscape's Netscape® browser and America Online's AOL® browser. These web browsers are suitable for operation with plug-ins, in order to enhance such operations. The plug-ins are packaged in a manner that accommodates specifications for a particular web browser.

Microsoft's Internet Explorer® browser implements plug-ins as ActiveX controls. The Netscape® browser refers to plug-ins as Netscape plug-ins. The AOL® browser implements plug-ins as either ActiveX controls (for older versions of the browser) or as Netscape plug-ins (for newer versions of the browser).

With ActiveX controls, the user interacts with a single dialog window to accept and install the plug-in. With Netscape plug-ins, the user interacts with one or more dialog windows to accept and install the plug-in, according to various installation routines. For both ActiveX controls and Netscape plug-ins, after a plug-in is downloaded and installed, the client activates the plug-in automatically (e.g., automatically caches and executes the plug-in), in response to the web browser accessing a particular web site (e.g., the web site from which the plug-in was initially downloaded).

Accordingly, with reference to FIGS. 5*a* and 5*b*, and with reference to the discussion of other Figs. hereinabove, the plug-in is a computer program processable by the client's IHS for causing the client's IHS to: (a) on a display device, within at least one web browser window, displaying a result of a search by a website in response to a search term query specified by a user, and displaying a list of folders; (b) on the display device, within the web browser window, highlight at least a portion of the displayed result of the search by the website; and (c) in response to a command from the user via the web browser window, save the highlighted portion in a folder that is selected by the user from among the displayed list of folders. In the illustrative embodiment, the user is a first user, and in response to a command from the first user, the IHS (in response to the computer program) selectively enables access to the selected folder by one or more second users specified by the first user.

In one example, the displayed result of the search is a result of a search of the website itself (e.g., the IHS outputs a web services call to the website, and the website performs the search in response to the web services call and outputs the result of the search to the IHS). In another example, the displayed result of the search is a result of a search of one or more other websites, such as an example in which: (a) the website is a first website, which performs the search by outputting a web services call to a second website; and (b) the second website performs the search in response to the web services call and outputs the result of the search to the first website.

In a further example, the displayed result of the search is displayed on the display device after translation from an original result of the search, such as an example in which the original result has: (a) an XML format (e.g., a generic XML format); or (b) a non-XML format. In one example, the displayed result of the search is rendered directly from the XML format. In yet another example, the displayed result of the search has the non-XML format (e.g., an HTML format). In such example, the IHS (in response to the computer program) translates the displayed result of the search from the non-XML format into an XML format, and the IHS (in response to the computer program) saves the XML-formatted information in the folder that is selected by the user from among the displayed list of folders.

Also, the illustrative embodiment includes a computer program that is processable by the client's IHS for causing the client's IHS to: (a) on a display device, display an excerpt of XML-formatted information, and display a list of folders; (b) in response to a command from a first user, save the displayed excerpt of the XML-formatted information in a folder that is selected by the first user from among the displayed list of folders; and (c) in response to a command from the first user, selectively enable access to the selected folder by one or more second users specified by the first user. The second users is/are either: (a) a single second user preselected by the first user; or (b) a group of second users preselected by the first user. The command (from the first user) occurs either before or after saving the displayed excerpt.

Further, the client's IHS (in response to the computer program) is operable to associate other information (e.g., information having a non-XML format) with the saved excerpt in the folder, so that access to the saved excerpt includes access to the other information. Examples of the other information are: (a) a human-readable text message; and (b) a hyperlink to a website. In saving the displayed excerpt of the XML-formatted information, the client's IHS (in response to the computer program) saves the displayed excerpt in an XML format. By comparison, in displaying the excerpt of the XML-formatted information, the client's IHS (in response to the computer program) displays the excerpt in a non-XML format (e.g., HTML format).

Moreover, the illustrative embodiment includes a computer program that is processable by the client's IHS for causing the client's IHS to: (a) receive an excerpt of information (e.g., an item of music); and (b) in response to the excerpt (e.g., in response to codes in the excerpt), perform at least one of the following operations: in an XML format, automatically storing the excerpt in a folder that is preselected by a first user, where the folder is accessible by one or more second users specified by the first user; and, in the XML format, automatically outputting the excerpt to one or more second users preselected by the first user.

In one example, before such translation, the excerpt has a non-XML format (e.g., specific to the configuration of the IHS), and the computer program is processable by the client's IHS for causing the client's IHS to: in response to the excerpt, automatically translate the excerpt from the non-XML format into the XML format, so that the translated excerpt is compatible for operation with another IHS of at least one of the second users. In a different example, before such translation, the excerpt has an alternate XML format (e.g., specific to the configuration of the IHS), and the computer program is processable by the client's IHS for causing the client's IHS to: in response to the excerpt, automatically translate the excerpt from the alternate XML format into a generic XML format (e.g., platform independent and not specific to the configuration of the IHS), so that the translated excerpt is compatible for operation with another IHS of at least one of the second users. In such examples, the stored excerpt is the translated excerpt, and the output excerpt is the translated excerpt.

Additionally, the illustrative embodiment includes a computer program that is processable by the client's IHS for causing the client's IHS to: (a) receive an excerpt of information; and (b) in response to a configuration of the IHS (e.g., as specified by one or more files of the IHS), perform at least one of the following operations: automatically translating the excerpt from an XML format into a non-XML format, so that the translated excerpt is compatible for operation with the IHS; and automatically translating the excerpt into an alternate XML format, so that the translated excerpt is compatible for operation with the IHS. In one example, before such translation, the excerpt has a generic XML format (e.g., platform independent and not specific to the configuration of the IHS), so that the IHS (in response to the computer program) automatically translates the excerpt from the generic XML format into either: (a) the alternate XML format (e.g., specific to the configuration of the IHS); or (b) the non-XML format (e.g., specific to the configuration of the IHS).

In this manner, multiple users are equipped to share XML-formatted information with one another. According to one example, in response to a user's suitable commands (e.g., a command to share XML-formatted information with other clients), the user's respective client: (a) automatically translates XML-formatted information from the alternate XML format (or the non-XML format) into a generic XML format; and (b) shares the generic XML-formatted information with other clients (e.g., by outputting the generic XML-formatted information to the sharing server). Likewise, in response to the user's suitable commands (e.g., a command to receive XML-formatted information that is shared from other clients), the user's respective client receives and automatically translates the shared XML-formatted information from the generic XML format into one or more alternate XML formats and non-XML formats, according to such client's respective configuration, so that the translated information is compatible for operation with such client. For example, if the shared XML-formatted information is a music playlist in the generic XML format, yet a user's client is primarily configured to play a Windows Media Player-formatted playlist, the user's client is programmed to automatically translate the XML-formatted playlist from the generic XML format into a Windows Media Player-formatted playlist, so that the translated playlist is compatible for operation with the user's client.

Moreover, the illustrative embodiment includes a computer program that is processable by a first IHS of a user, for causing the first IHS to: (a) receive an excerpt of information associated with the user; (b) in response to the excerpt, automatically translate the excerpt into an XML format, so that the translated excerpt is compatible for operation with a second IHS of the user; and (c) synchronize the translated excerpt with the second IHS. In one example, before such translation, the excerpt has a non-XML format (e.g., specific to the configuration of the first IHS), so that the first IHS (in response to the computer program) automatically translates the excerpt from the non-XML format into the XML format, so that the translated excerpt is compatible for operation with the second IHS. In a different example, before such translation, the excerpt has an alternate XML format (e.g., specific to the configuration of the IHS), so that the first IHS (in response to the computer program) automatically translates the excerpt from the alternate XML format into a generic XML format (e.g., platform independent and not specific to the configuration of the IHS), so that the translated excerpt is compatible for operation with the second IHS. For example, if the user commands the first IHS to save the XML-formatted excerpt in a "personal" folder of the user (e.g., a folder that is privately accessed by the user), yet the user has multiple IHSs (e.g., systems in remote locations), the system 100 synchronizes the translated excerpt with the second IHS (and across other IHSs of the user) in XML format (e.g., RSS). Such a personal folder is suitable for saving user-specified XML-formatted excerpts of: (a) websites (e.g., the user's "favorites" list); (b) search queries; (c) search results; and (d) music items (e.g., playlists).

Referring again to FIG. 2, the computer-readable medium 212 is a floppy diskette. The computer-readable medium 212 and the computer 204 are structurally and functionally interrelated with one another as described further hereinbelow. Each IHS of the illustrative embodiment is structurally and functionally interrelated with a respective computer-readable medium, similar to the manner in which the computer 204 is structurally and functionally interrelated with the computer-readable medium 212. In that regard, the computer-readable medium 212 is a representative one of such computer-readable media, including for example but not limited to the storage device 211.

The computer-readable medium 212 stores (e.g., encodes, or records, or embodies) functional descriptive material (e.g., including but not limited to software (also referred to as computer programs or applications) and data structures). Such functional descriptive material imparts functionality when encoded on the computer-readable medium 212. Also, such functional descriptive material is structurally and functionally interrelated to the computer-readable medium 212.

Within such functional descriptive material, data structures define structural and functional interrelationships between such data structures and the computer-readable medium 212 (and other aspects of the computer 204, the IHS 200 and the system 100). Such interrelationships permit the data structure' functionality to be realized. Also, within such functional descriptive material, computer programs define structural and functional interrelationships between such computer programs and the computer-readable medium 212 (and other aspects of the computer 204, the IHS 200 and the system 100). Such interrelationships permit the computer programs' functionality to be realized.

For example, the computer 204 reads (e.g., accesses or copies) such functional descriptive material from the computer-readable medium 212 into the memory device of the computer 204, and the computer 204 performs its operations (as described elsewhere herein) in response to such material which is stored in the memory device of the computer 204. More particularly, the computer 204 performs the operation of processing a computer application (that is stored, encoded, recorded or embodied on a computer-readable medium) for causing the computer 204 to perform additional operations (as described elsewhere herein). Accordingly, such functional descriptive material exhibits a functional interrelationship with the way in which computer 204 executes its processes and performs its operations.

Further, the computer-readable medium 212 is an apparatus from which the computer application is accessible by the computer 204, and the computer application is processable by the computer 204 for causing the computer 204 to perform such additional operations. In addition to reading such functional descriptive material from the computer-readable medium 212, the computer 204 is capable of reading such functional descriptive material from (or through) the network 112 which is also a computer-readable medium (or apparatus). Moreover, the memory device of the computer 204 is itself a computer-readable medium (or apparatus).

Although illustrative embodiments have been shown and described, a wide range of modification, change and substitution is contemplated in the foregoing disclosure and, in some instances, some features of the embodiments may be employed without a corresponding use of other features.

What is claimed is:

1. A computer implemented method comprising:
   receiving, via a server, from a first information handling system of a user, an excerpt of information associated with the user, wherein a first client computer comprises the first information handling system;
   in response to receiving the excerpt, automatically translating, via the server, the excerpt into an XML format to be compatible, without further translation, for operation with at least one second information handling system of the user;
   saving, via the server, the translated excerpt in a first personal folder associated with the user of the first information handling system, the translated excerpt including a user-specified item of music, a website, a search query, and a search result;
   synchronizing, via the server, the translated excerpt with the second information handling system, wherein a version of the translated excerpt is saved in a second personal folder associated with the user of the second information handling system and a third personal folder associated with the user of the server, wherein a second client computer comprises the second information handling system; and
   associating, via the server, a name, a source, and a comment with the translated excerpt.

2. The method of claim 1, wherein the excerpt has a non-XML format, and wherein automatically translating comprises:
   in response to receiving the excerpt, automatically translating the excerpt from the non-XML format into the XML format to be compatible for operation with the second information handling system.

3. The method of claim 1, wherein the excerpt has an alternate XML format, and wherein automatically translating comprises:
   in response to receiving the excerpt, automatically translating the excerpt from the alternate XML format into a generic XML format to be compatible for operation with the second information handling system.

4. The method of claim 1, further comprising:
   saving the XML-formatted excerpt in a personal folder of the user.

5. The method of claim 1, wherein the XML-formatted excerpt is a user-specified website.

6. The method of claim 1, wherein the XML-formatted excerpt is a user-specified search query.

7. The method of claim 1, wherein the XML-formatted information is a user-specified search result.

8. A computer system comprising:
   a server in communication with a first client including at least one first information handling system of a user for:
   receiving an excerpt of information associated with the user;
   in response to receiving the excerpt, automatically translating the excerpt into an XML format to be compatible, without further translation, for operation with a second client including at least one second information handling system of the user;
   saving the translated excerpt in a first personal folder associated with the user of the first information handling system, the translated excerpt including a user-specified item of music, a website, a search query, and a search result;
   synchronizing the translated excerpt with the second information handling system, wherein a version of the translated excerpt is saved in a second personal folder associated with the user of the second information handling system and a third personal folder associated with the user of the server; and
   associating a name, a source, and a comment with the translated excerpt.

9. The system of claim 8, wherein the excerpt has a non-XML format, and wherein the first information handling system is configured to:
   in response to receiving the excerpt, automatically translate the excerpt from the non-XML format into the XML format to be compatible for operation with the second information handling system.

10. The system of claim 8, wherein the excerpt has an alternate XML format, and wherein the first information handling system is configured to:
    in response to receiving the excerpt, automatically translate the excerpt from the alternate XML format into a generic XML format to be compatible for operation with the second information handling system.

11. The system of claim 8, and wherein the first information handling system is configured to:
    save the XML-formatted excerpt in a personal folder of the user.

12. The system of claim 8, wherein the XML-formatted excerpt is a user-specified website.

13. The system of claim 8, wherein the XML-formatted excerpt is a user-specified search query.

14. The system of claim 8, wherein the XML-formatted information is a user-specified search result.

15. A machine readable device having stored thereon a set of instructions, which when executed, perform a method comprising:

receiving an excerpt of information associated with the user from a first client computer including a first information handling system;

in response to receipt of the excerpt, automatically translating the excerpt into an XML format to be compatible, without further translation, for operation with a second client computer including at least one second information handling system of the user;

saving the translated excerpt in a first personal folder associated with the user of the first information handling system, the translated excerpt including a user-specified item of music, a website, a search query, and a search result; and synchronizing the translated excerpt with the second information handling system wherein a version of the translated excerpt is saved in a second personal folder associated with the user of the second information handling system and a third personal folder associated with the user of the server; and associating a name, a source, and a comment with the translated excerpt; and associating a name, a source, and a comment with the translated excerpt.

16. The machine readable device of claim 15, wherein the excerpt has a non-XML format, further comprising:

In response to the receipt of the excerpt, automatically translating the excerpt from the non-XML format into the XML format to be compatible for operation with the second information handling system.

17. The machine readable device of claim 15, wherein the excerpt has an alternate XML format, further comprising:

in response to receipt of the excerpt, automatically translating the excerpt from the alternate XML format into a generic XML format to be compatible for operation with the second information handling system.

18. The machine readable device of 15, further comprising:
Saving the XML formatted excerpt in a personal folder of the user.

19. The machine readable device of claim 15, wherein the XML-formatted excerpt is a user-specified website.

20. The machine readable device of claim 15, wherein the XML-formatted excerpt is a user-specified search query.

21. The machine readable device of claim 15, wherein the XML-formatted information is a user-specified search result.

* * * * *